US010841945B2

United States Patent
Lee et al.

(10) Patent No.: US 10,841,945 B2
(45) Date of Patent: Nov. 17, 2020

(54) METHOD AND USER EQUIPMENT OF TRANSMITTING UPLINK SIGNAL IN WIRELESS COMMUNICATION SYSTEM, AND METHOD AND BASE STATION OF RECEIVING UPLINK SIGNAL IN WIRELESS COMMUNICATION SYSTEM

(71) Applicant: LG ELECTRONICS INC., Seoul (KR)

(72) Inventors: Hyunho Lee, Seoul (KR); Kyuhwan Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/887,979

(22) Filed: May 29, 2020

(65) Prior Publication Data

US 2020/0296756 A1    Sep. 17, 2020

Related U.S. Application Data

(63) Continuation of application No. 16/376,491, filed on Apr. 5, 2019.

(Continued)

(30) Foreign Application Priority Data

May 17, 2018   (KR) ........................ 10-2018-0056704

(51) Int. Cl.
*H04W 72/12*   (2009.01)
*H04W 72/04*   (2009.01)
*H04L 5/00*   (2006.01)

(52) U.S. Cl.
CPC ....... *H04W 72/1289* (2013.01); *H04L 5/0051* (2013.01); *H04L 5/0053* (2013.01); *H04W 72/042* (2013.01); *H04W 72/1268* (2013.01)

(58) Field of Classification Search
CPC ......... H04W 72/1289; H04W 72/1268; H04W 72/042; H04L 5/0051; H04L 5/0053
See application file for complete search history.

(56) References Cited

U.S. PATENT DOCUMENTS

2016/0219618 A1*  7/2016  Rico Alvarino ...... H04L 1/1671
2016/0295574 A1   10/2016  Papasakellariou
(Continued)

FOREIGN PATENT DOCUMENTS

KR   1020150073971   7/2015
KR   1020170107426   9/2017

OTHER PUBLICATIONS

3rd Generation Partnership Project; Technical Specification Group Radio Access Network; Evolved Universal Terrestrial Radio Access (E-UTRA); Physical layer procedures (Release 15), "3GPP TS 36.213 V15.3.0 (Sep. 2018)," 2018, 546 pages.

(Continued)

*Primary Examiner* — Walli Z Butt
(74) *Attorney, Agent, or Firm* — Fish & Richardson P.C.

(57) ABSTRACT

A method of transmitting an uplink (UL) signal by a user equipment (UE) in a wireless communication system, where the method includes: receiving, through a physical downlink control (PDCCH) signal, downlink control information (DCI) regarding a semi-persistent scheduling (SPS) physical uplink shared channel (PUSCH); and periodically transmitting an SPS PUSCH signal based on the DCI. Periodically transmitting the SPS PUSCH signal based on the DCI includes: in a state in which (i) the SPS PUSCH signal is subslot-based, (ii) a demodulation reference signal (DMRS) pattern field included in the DCI is set to a first value, and (iii) simultaneous transmission of a physical uplink control channel (PUCCH) and the PUSCH is configured for the UE: transmitting uplink control information (UCI) through the (Continued)

SPS PUSCH signal, without simultaneously transmitting a PUCCH signal.

15 Claims, 13 Drawing Sheets

Related U.S. Application Data

(60) Provisional application No. 62/675,092, filed on May 22, 2018, provisional application No. 62/669,975, filed on May 10, 2018, provisional application No. 62/667,573, filed on May 6, 2018, provisional application No. 62/653,537, filed on Apr. 5, 2018.

(56) References Cited

U.S. PATENT DOCUMENTS

| | | | |
|---|---|---|---|
| 2017/0181155 A1* | 6/2017 | Chen | H04W 72/0413 |
| 2017/0208590 A1 | 7/2017 | Kim et al. | |
| 2017/0302419 A1* | 10/2017 | Liu | H04W 48/12 |
| 2017/0317794 A1 | 11/2017 | You et al. | |
| 2018/0124753 A1* | 5/2018 | Sun | H04L 1/0079 |
| 2018/0302895 A1* | 10/2018 | Akkarakaran | H04W 72/0413 |
| 2019/0174466 A1* | 6/2019 | Zhang | H04L 5/005 |
| 2019/0313436 A1* | 10/2019 | Lee | H04L 1/1822 |

OTHER PUBLICATIONS

Huawei, "Summary of email discussion [90b-L TE-16] on SPS details," R1-1719958, 3GPP TSG RAN WG1 Meeting #91, Reno, USA, Nov. 27-Dec. 1, 2017, 16 pages.

LG Electronics, "Corrections on collision handling between subslot UL SPS and SPUCCH," R1-1808457, 3GPP TSG RAN WG1 Meeting #94, Gothenburg, Sweden, Aug. 20-24, 2018, 5 pages.

LG Electronics, "UCI on PUSCH and UL channel multiplexing for NR", R1-1719927, 3GPP TSG RAN WG1 Meeting 91, Reno, USA, Nov. 27-Dec. 1, 2017, 17 pages.

PCT International Search Report and Written Opinion in International Application No. PCT/KR2019/004033, dated Jul. 29, 2019, 10 pages.

Qualcomm Incorporated, "Summary of remaining issues for UCI piggyback on PUSCH," R1-1803332, 3GPP TSG RAN WG1 Meeting #92, Athens, Greece, Feb. 26-Mar. 2, 2018, 10 pages.

LG Electronics, "Remaining issues on UL data transmission procedure," R1-1719932, 3GPP TSG RAN WG1 Meeting 91, Reno, USA, Nov. 27-Dec. 1, 2017, 15 pages.

LG Electronics, "Remaining issues on UL data transmission procedure," R1-1800382, 3GPP TSG RAN WG1 Meeting AH 1801, Vancouver, Canada, Jan. 22-26, 2018, 13 pages.

Ericsson, "Corrections to sTTI and SPT implementation," R1-1803861, 3GPP TSG-RAN1 Meeting #92bis, Sanya, P. R. China, dated Apr. 16-20, 2018, 45 pages, XP051412815.

Ericsson, "RAN1 decisions for WI Shortened TTI and processing time for LTE (LTE_sTTiandPT),"R1-1803173, 3GPP TSG RAN Wg 1 Meeting #92, Athens, Greece, dated Feb. 26-Mar. 2, 2018, 57 pages, XP051412725.

Extended European Search Report in European Application No. 19780670.6, dated Aug. 4, 2020, 16 pages.

\* cited by examiner

METHOD AND USER EQUIPMENT OF TRANSMITTING UPLINK SIGNAL IN WIRELESS COMMUNICATION SYSTEM, AND METHOD AND BASE STATION OF RECEIVING UPLINK SIGNAL IN WIRELESS COMMUNICATION SYSTEM

CROSS-REFERENCE TO RELATED APPLICATIONS

The present application is a continuation of U.S. application Ser. No. 16/376,491, filed on Apr. 5, 2019, now allowed, which claims the benefit of an earlier filing date and right of priority to U.S. Provisional Application No. 62/653,537, filed on Apr. 5, 2018, U.S. Provisional Application No. 62/667,573, filed on May 6, 2018, U.S. Provisional Application No. 62/669,975, filed on May 10, 2018, Korean Provisional Application No. 10-2018-0056704, filed on May 17, 2018, and U.S. Provisional Application No. 62/675,092, filed on May 22, 2018, the contents of which are hereby incorporated by reference in their entirety.

TECHNICAL FIELD

The present disclosure generally relates to a wireless communication system.

BACKGROUND

In a wireless communication system, a user equipment (UE) typically transmits signals to a base station (BS) via an uplink (UL), and the UE receives signals from the BS via a downlink (DL). Various types of signals, including data signals and control signals, are communicated via the UL and DL. Scheduling of such communications is typically performed, to achieve improved efficiency, latency, and/or reliability.

SUMMARY

One general aspect of the present disclosure includes a method of transmitting an uplink (UL) signal by a user equipment (UE) in a wireless communication system, the method including: receiving, through a physical downlink control (PDCCH) signal, downlink control information (DCI) regarding a semi-persistent scheduling (SPS) physical uplink shared channel (PUSCH). The method also includes periodically transmitting an SPS PUSCH signal based on the DCI, where periodically transmitting the SPS PUSCH signal based on the SCI includes: in a state in which (i) the SPS PUSCH signal is subslot-based, (ii) a demodulation reference signal (DMRS) pattern field included in the DCI is set to a first value, and (iii) simultaneous transmission of a physical uplink control channel (PUCCH) and the PUSCH is configured for the UE: transmitting uplink control information (UCI) through the SPS PUSCH signal, without simultaneously transmitting a PUCCH signal. Other embodiments of this aspect include corresponding computer systems, apparatus, and computer programs recorded on one or more computer storage devices, each configured to perform the actions of the methods.

Implementations may include one or more of the following features. The method where a periodicity of the SPS PUSCH signal is configured to be one subslot. The method where a transmission of the PUCCH signal is configured to overlap with a transmission of the SPS PUSCH signal in a time domain. The method where, based on the DMRS pattern field being set to the first value, one-time UL DMRS transmission is configured to be shared between a plurality of SPS PUSCH signal transmissions. The method where the DMRS pattern field indicates whether the SPS PUSCH signal and a UL DMRS are transmitted in a same slot. The method where, based on the DMRS pattern field being set to the first value, the SPS PUSCH signal and the UL DMRS are transmittable in different subslots, and based on the DMRS pattern field being set to a second value, the SPS PUSCH signal and the UL DMRS are restricted to be transmitted in a same subslot. The method where, based on the DMRS pattern field being set to the first value: a first UL DMRS, for an SPS PUSCH signal that was transmitted in subslot #1, is transmitted in subslot #2, and a second UL DMRS, for an SPS PUSCH signal that was transmitted in subslot #4, is transmitted in subslot #5. The method where the DMRS pattern field is 2 bits, and where the first value has a bit value of '10'. The method further including: in the state in which (i) the SPS PUSCH signal is subslot-based, (ii) the DMRS pattern field included in the DCI is set to the first value, and (iii) simultaneous transmission of the PUCCH and the SPS PUSCH is configured for the UE, and based on transmitting the UCI through the SPS PUSCH signal: dropping the PUCCH signal, regardless of whether a transmission power of the SPS PUSCH signal is changed due to the PUCCH signal. The method where a plurality of UL SPS configurations is configured for the UE in relation to UL SPS, and where different hybrid automatic repeat request (HARD) process sets are associated with the plurality UL SPS configurations, respectively. Implementations of the described techniques may include hardware, a method or process, or computer software on a computer-accessible medium.

Another general aspect includes a method of receiving an uplink (UL) signal by a base station (BS) in a wireless communication system, the method including: transmitting, through a physical downlink control (PDCCH) signal, downlink control information (DCI) regarding a semi-persistent scheduling (SPS) physical uplink shared channel (PUSCH). The method also includes periodically receiving an SPS PUSCH signal based on the DCI, where periodically receiving the SPS PUSCH signal based on the DCI includes: in a state in which (i) the SPS PUSCH signal is subslot-based, (ii) a demodulation reference signal (DMRS) pattern field included in the DCI is set to a first value, and (iii) simultaneous transmission of a physical uplink control channel (PUCCH) and the PUSCH is configured for the UE: receiving uplink control information (UCI) through the SPS PUSCH signal, without simultaneously receiving a PUCCH signal. Other embodiments of this aspect include corresponding computer systems, apparatus, and computer programs recorded on one or more computer storage devices, each configured to perform the actions of the methods.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1A:
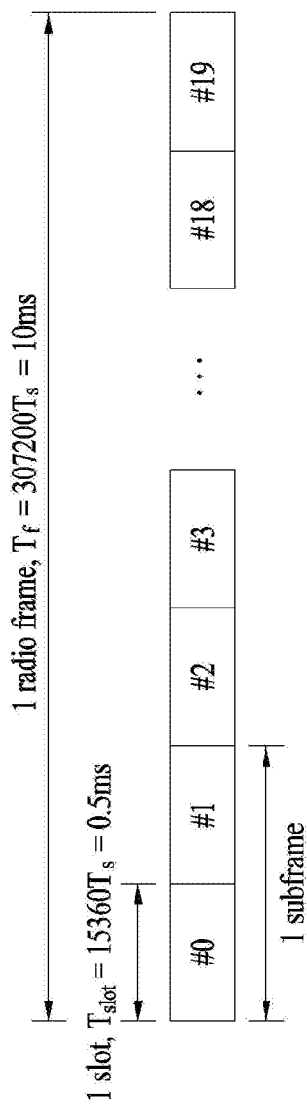
FIGS. 1A and 1B are diagrams showing examples of a radio frame structure used in a wireless communication system.

Implementations are disclosed that enable transmitting an uplink signal by a user equipment (UE) and receiving the uplink signal by a base station (BS).

In some systems, such as those compatible with long-term evolution (LTE), downlink (DL)/uplink (UL) scheduling (simply, dynamic scheduling) may be implemented through a dynamic DL/UL grant. Dynamic scheduling enables transmission of DL control information (DCI) over a physical downlink control channel (PDCCH) during every DL/UL transmission. In such scenarios, scheduling flexibility is increased while scheduling overhead is also increased.

Furthermore, in some systems, semi-persistent scheduling (SPS) may be implemented. SPS scheduling may be useful in scenarios in which relatively small data packets, such as voice over Internet protocol (VoIP), are periodically transmitted. SPS scheduling may be advantageous in reducing overhead. In some scenarios, SPS scheduling may be activated based on a UE receiving a PDCCH that is scrambled with a SPS cell radio network temporary identifier (C-RNTI). Based on activation of SPS scheduling, the UE may periodically transmit and receive an SPS signal to and from a BS, without further receiving the PDCCH. To deactivate SPS scheduling, the UE may receive the PDCCH scrambled with the SPS C-RNTI, and end transmission and reception of the SPS signal.

In some scenarios, even in a state in which SPS scheduling has been activated, the UE may monitor the PDCCH corresponding to dynamic scheduling. If SPS scheduling collides with dynamic scheduling on the PDCCH, then the UE may conform to the dynamic scheduling.

Implementations disclosed herein may enable more efficient and accurate transmission and reception of an SPS-based UL signal by a UE and a BS and an apparatus therefor.

In some systems, a DMRS may be shared between periodically transmitted SPS PUSCH signals, which may enable efficient use of radio resources. However, situations may arise where the SPS PUSCH signals overlap with PUCCH signals (e.g., if the UE is configured to perform simultaneous PUCCH-PUSCH transmission). In such situations, reception of the SPS PUSCH signals may be negatively impacted.

According to implementations disclosed herein, the UE drops the PUCCH signals even if PUCCH-PUSCH simultaneous transmission is configured for the UE. In some scenarios, implementations disclosed herein may enable the UE to maintain power at a more constant level over the SPS PUSCH signals. As a result, transmission and reception of the SPS PUSCH signals can be more accurately performed between the UE and a BS.

It will be appreciated by persons skilled in the art that that the effects that could be achieved with the present disclosure are not limited to what has been particularly described hereinabove and that other advantages of the present disclosure will be more clearly understood from the following detailed description.

Reference will now be made in detail to various implementations of the present disclosure, examples of which are illustrated in the accompanying drawings. The accompanying drawings illustrate examples of implementations of the present disclosure and provide a more detailed description of the present disclosure. However, the scope of the present disclosure should not be limited thereto.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, implementations of the present disclosure with respect to a method of performing coordinated data transmission using some or all nodes can be applied to various types of multi-node systems. For example, a node refers to an antenna group spaced apart from another node by a predetermined distance or more, in general. However, implementations of the present disclosure, which will be described below, can even be applied to a case in which a node refers to an arbitrary antenna group irrespective of node interval. In the case of an eNB including an X-pole (cross polarized) antenna, for example, the implementations of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may refer to communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In some systems, such as those compatible with 3GPP LTE-A, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this may include scenarios, for example, where the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1B:
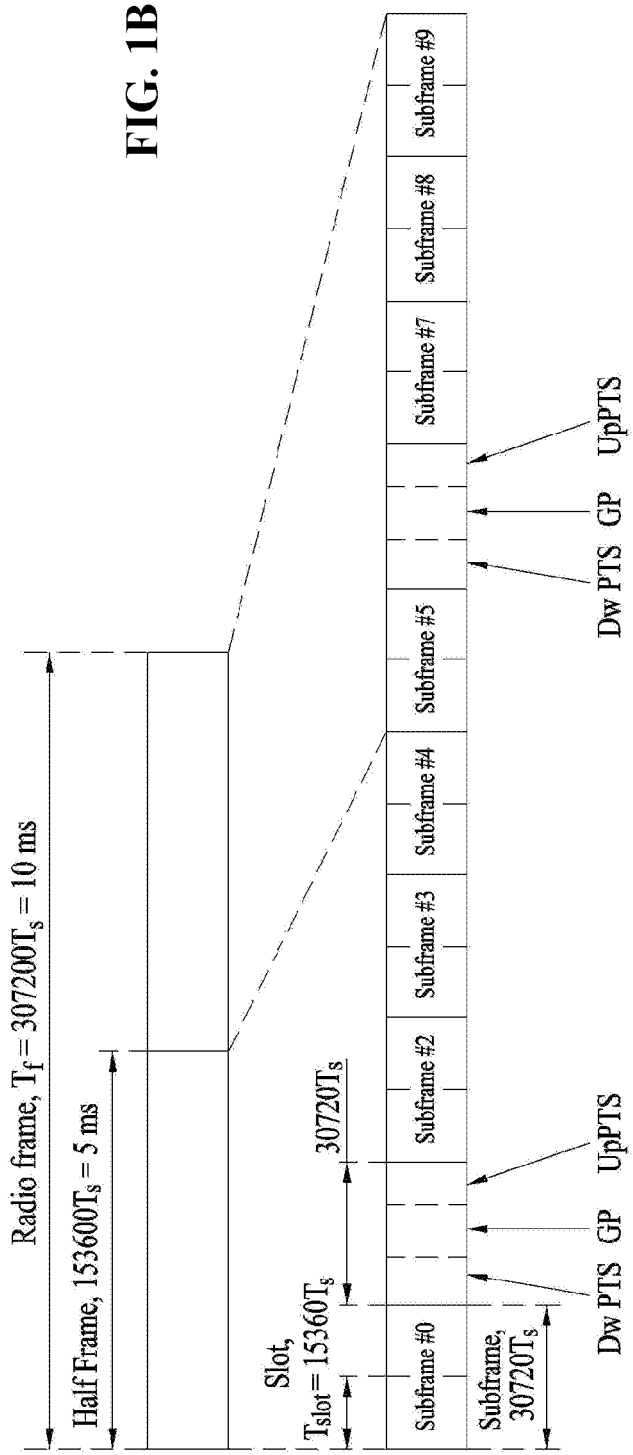

FIGS. 1A and 1B illustrate examples of a radio frame structure used in a wireless communication system. FIG. 1A illustrates a frame structure for frequency division duplex (FDD) and FIG. 1B illustrates a frame structure for time division duplex (TDD). Such frame structures may be implemented, for example, in systems that are compatible with 3GPP LTE/LTE-A.

Referring to FIGS. 1A and 1B, in some systems, such as those compatible with 3GPP LTE/LTE-A, a radio frame has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows examples of DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows an example of a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | |
| 5 | 6592 · $T_s$ | 4384 · $T_s$ | *5120 · $T_s$ | 20480 · $T_s$ | | *5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
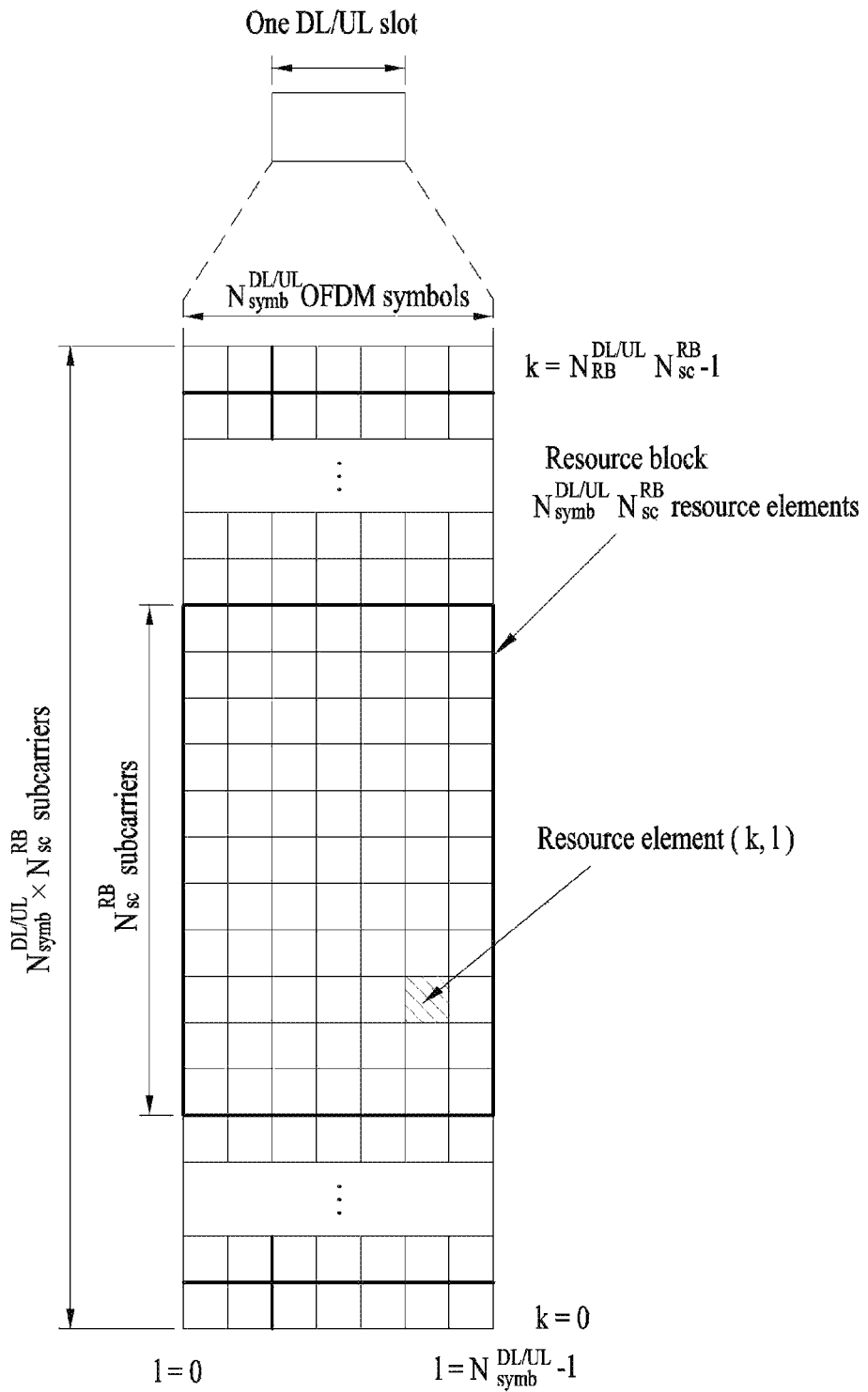
FIG. 2 is a diagram showing an example of a downlink/uplink (DL/UL) slot structure in a wireless communication system.

FIG. 2 illustrates an example of downlink/uplink slot structure in a wireless communication system. Particularly, FIG. 2 illustrates a resource grid structure per antenna port. The structure of FIG. 2 may be implemented, for example, in systems that are compatible with 3GPP LTE/LTE-A.

Referring to the example of FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{sYmb}^{DL}$ denotes the number of OFDM symbols in the downlink slot and $N_{sYmb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, implementations of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC)

component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
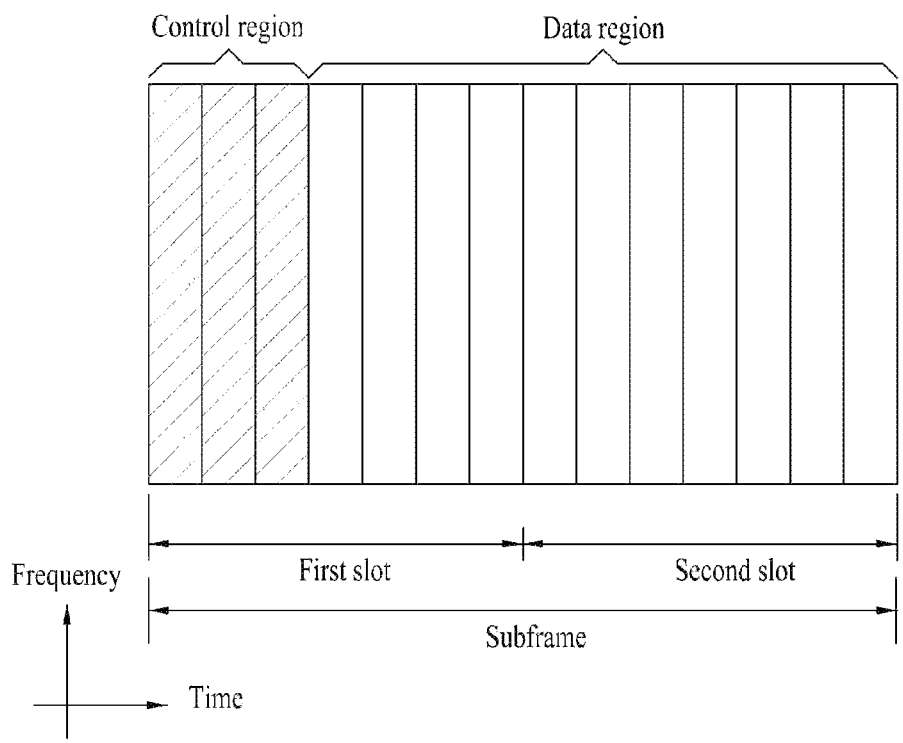
FIG. 3 is a diagram showing an example of a DL subframe structure used in a system that is compatible with 3GPP LTE/LTE-A.

FIG. 3 illustrates an example of a downlink (DL) subframe structure. This structure may be implemented, for example, in systems that are compatible with 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared channel (PDSCH) is allocated. A resource region available for PDSCH transmission in the DL subframe is referred to as a PDSCH region hereinafter. Examples of downlink control channels include a physical control format indicator channel (PCFICH), a physical downlink control channel (PDCCH), a physical hybrid ARQ indicator channel (PHICH), etc. Such downlink control channels may be implemented, for example, in systems that are compatible with 3GPP LTE/LTE-A. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, may be defined. Such formats may be implemented, for example, in systems that are compatible with 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE may depend on transmission mode (TM) set for the UE. For example, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. In some systems, for example system that are compatible with 3GPP LTE, a CCE set may be implemented in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In some systems, such as those compatible with 3GPP LTE/LTE-A, search spaces for DCI formats may have different sizes and include a dedicated search space and a common search space. The dedicated search space is a UE-specific search space and is configured for each UE. The common search space is configured for a plurality of UEs. Examples of aggregation levels defining the search space may be as follows.

TABLE 3

| Type | Search Space $S_k^{(L)}$ | | Number of PDCCH candidates $M^{(L)}$ |
|---|---|---|---|
| | Aggregation Level L | Size[in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in some systems, e.g., systems compatible with 3GPP LTE(-A), a CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
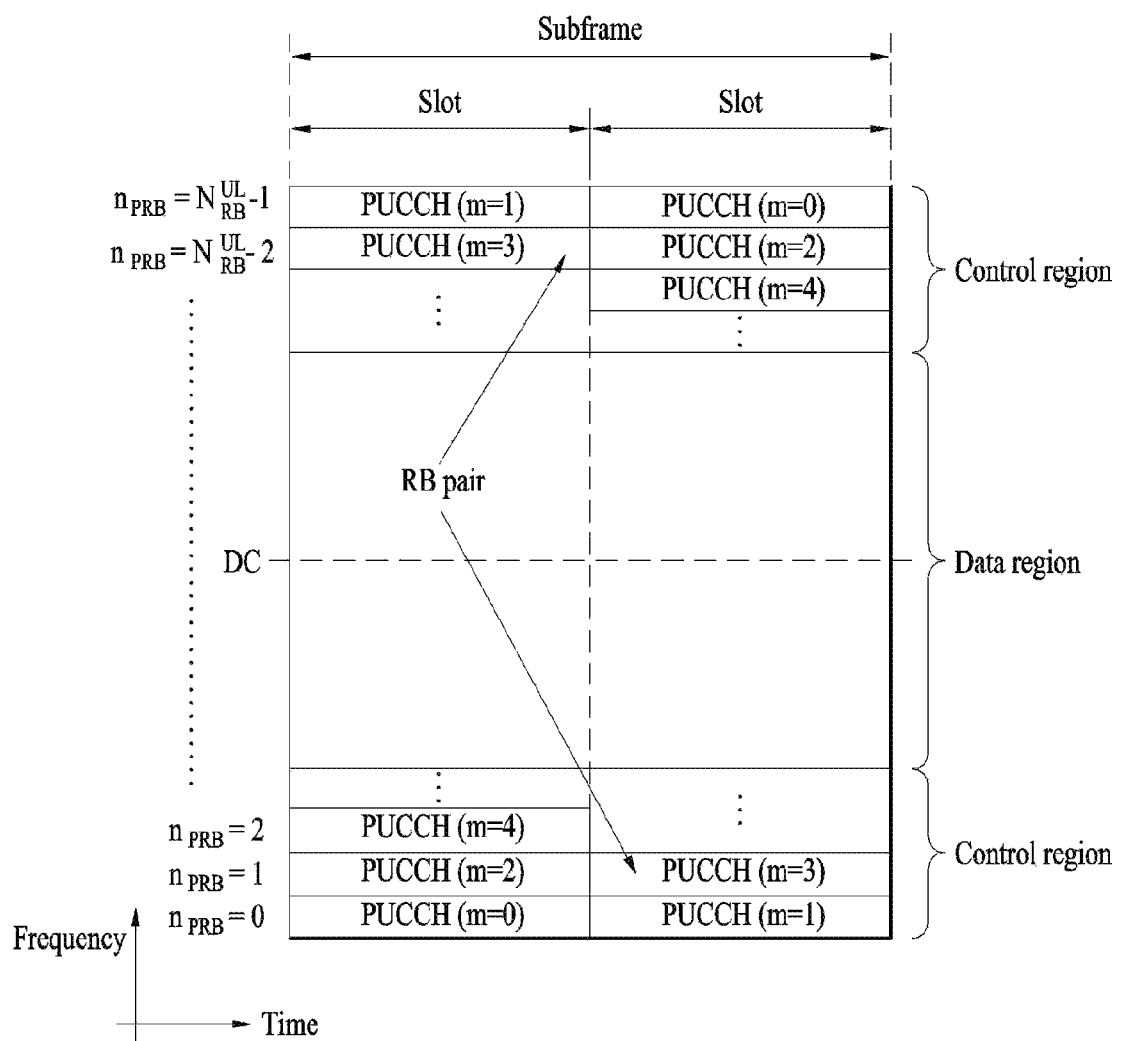
FIG. 4 is a diagram showing an example of a UL subframe structure used in a system that is compatible with 3GPP LTE/LTE-A.

FIG. 4 illustrates an example of an uplink subframe structure. This structure may be implemented, for example, in systems that are compatible with 3GPP LTE/LTE-A.

Referring to the example of FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit, for example, the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows an example of the mapping relationship between PUCCH formats and UCI. Such mapping relationships may be implemented, for example, in systems that are compatible with LTE/LTE-A.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In some systems, for example systems that are compatible with LTE, the uplink reference signal may include:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal may include, for example:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
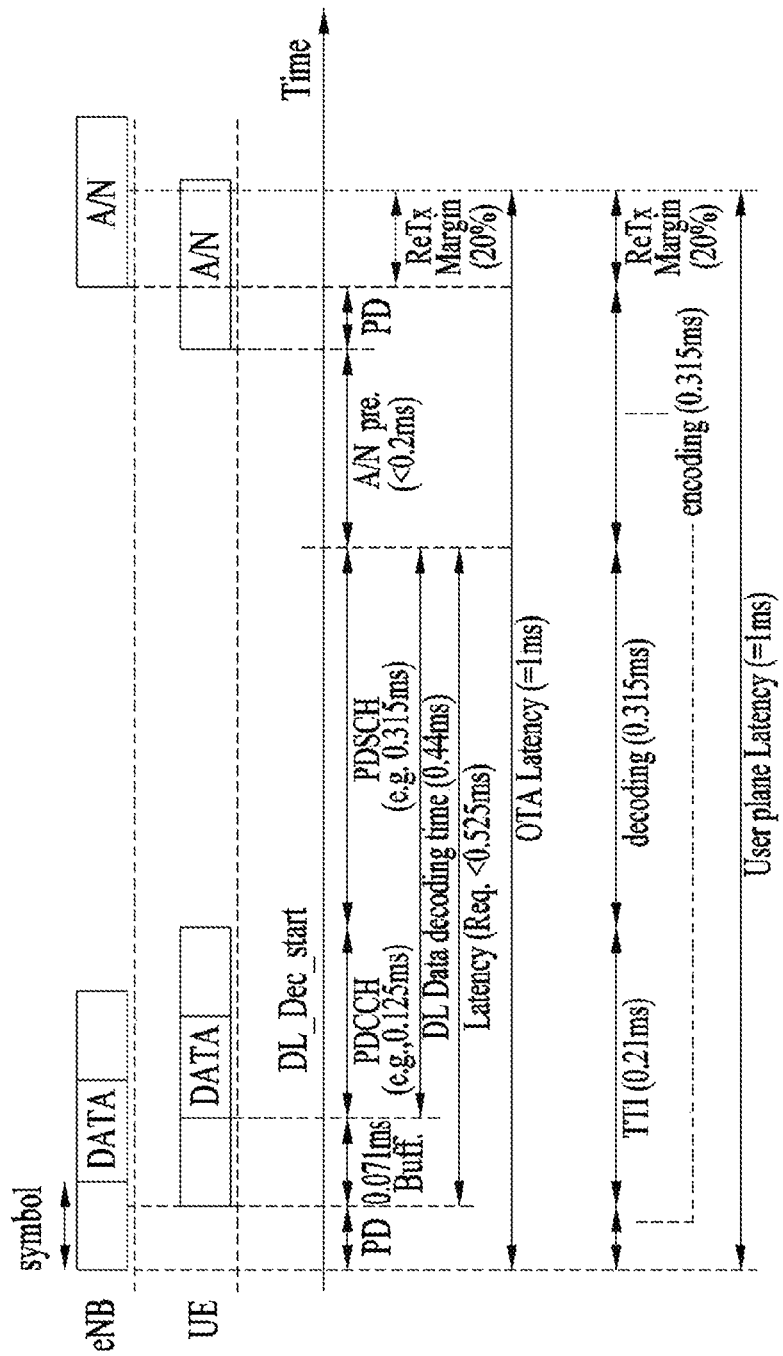
FIG. 5 is a diagram showing an example of reduction in a TTI length according to reduction in user plane latency.

In some implementations, a shortened TTI (sTTI), e.g., of 0.5 msec or less, may be implemented as a minimum unit of data transmission. In such implementations, the shortened TTI may provide, in some scenarios, reduced latency. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
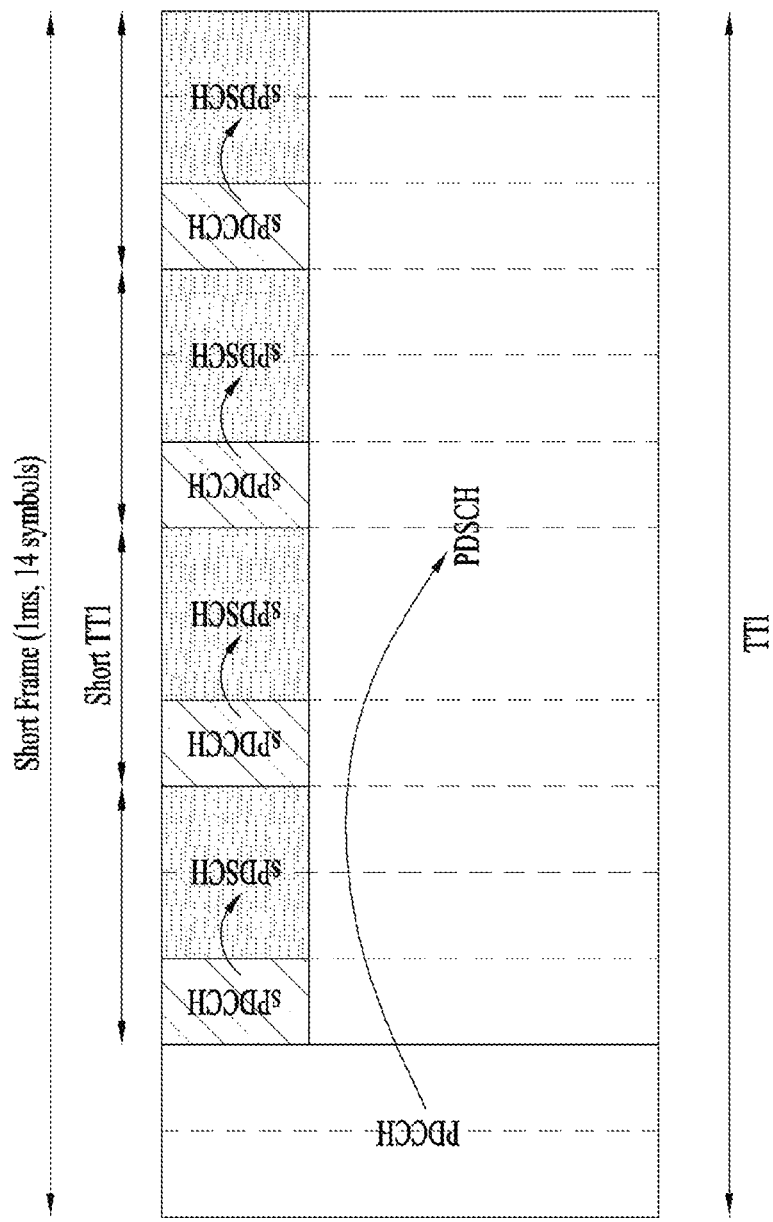
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by certain control channels (e.g., legacy control channels). The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

In some systems, for example in systems that are compatible with LTE/LTE-A, in scenarios of a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an implementation shown in the examples of FIGS. 7A-7D below. In some implementations, the case in which one symbol is configured as a TTI may also be configured. When one symbol is one TTI unit, 12 TTIs may be generated based on a PDCCH (e.g., a legacy PDCCH) being transmitted in two OFDM symbols.

Figure 7A:
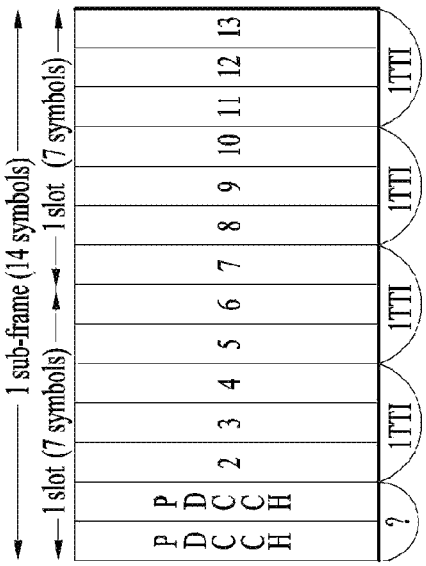
FIGS. 7A, 7B, 7C, and 7D are diagrams showing examples of a DL subframe structure including a short TTI with a plurality of lengths (symbol numbers)
Figure 7B:
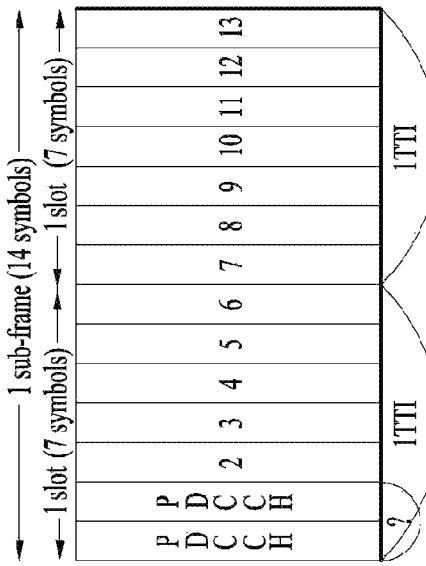
Figure 7C:
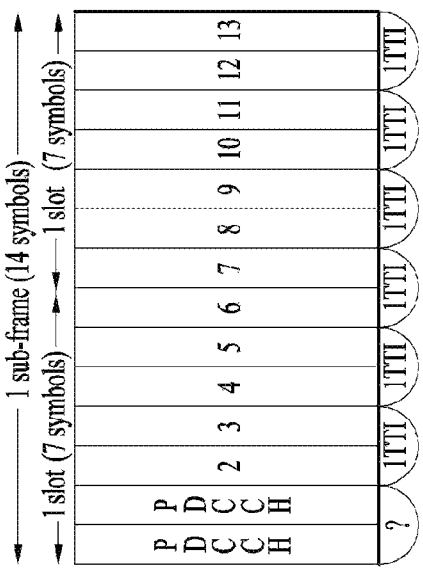

As shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. In this case, the first two OFDM symbols may transmit a PDCCH (e.g., a legacy PDCCH).

Figure 7D:
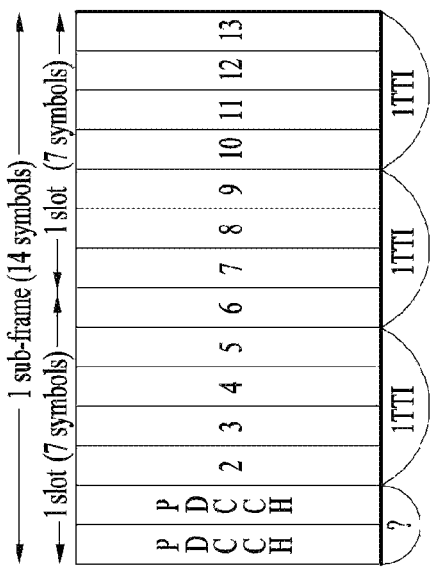

As shown in FIG. 7D, when seven symbols are configured with one TTI, then one TTI of seven symbol units including a PDCCH (e.g., a legacy PDCCH) and seven subsequent symbols may be configured as one TTI. In this case, in scenarios where a UE supports an sTTI, when one TTI includes seven symbols, then it may be assumed that puncture or rate-matching is performed on two OFDM symbols positioned at a fore end for transmitting a PDCCH (e.g., a legacy PDCCH) with respect to a TTI (first symbol) positioned at a fore end of one subframe. Furthermore, it may be assumed that corresponding data and/or control information are transmitted in five symbols. On the other hand, it may be assumed that a UE is able to transmit data and/or control information all seven symbols without a punctured or rate-matched resource region with respect to a TTI (second slot) positioned at a rear end of one subframe.

Figure 8A:
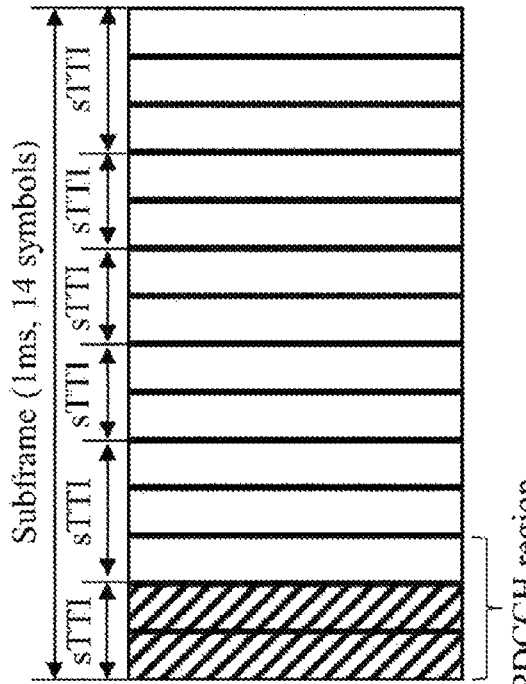
FIGS. 8A and 8B are diagrams showing examples of a DL subframe structure including a short TTI including two or three symbols.
Figure 8B:
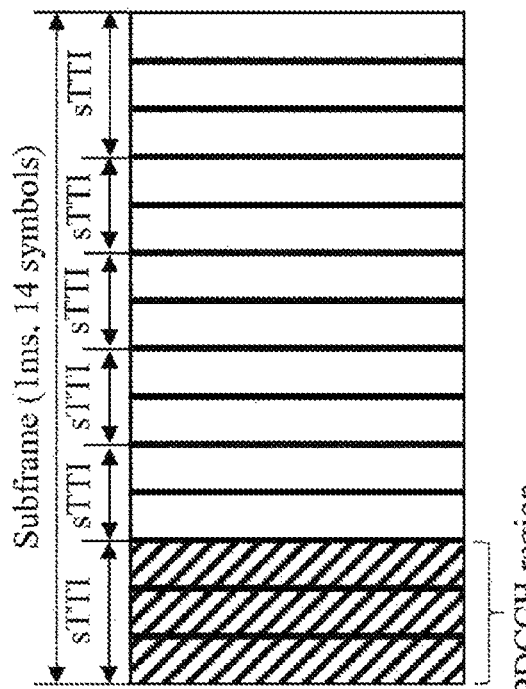

According to the present disclosure, an sTTI including two OFDM symbols (hereinafter, "OS") and an sTTI including three OSs may be considered to include sTTI structures that are combined and present in one subframe, as shown in the examples of FIGS. 8A and 8B. The sTTI including 2-OS or 3-OS sTTIs may be referred to as a 2-symbol sTTI (i.e., 2-OS sTTI). Also, 2-symbol sTTI or 3-symbol sTTI may be simply referred to as 2-symbol TTI or 3-symbol TTI, respectively, with the understanding that these are TTIs shorter than a 1 ms TTI. As such, where appropriate in the present disclosure, the term "TTI" may be used for simplicity instead of "sTTI" with the understanding that implementations of the present disclosure are directed to communication systems and techniques utilizing TTIs that are shorter than a 1-ms TTI.

Furthermore, as used herein, a numerology refers to a length of a TTI that is implemented in the wireless communication system, a subcarrier interval, and the like, or a parameter or a communication structure or system based on the parameter such as the defined length of the TTI or sub-carrier spacing.

As shown in FIG. 8A, an sPDCCH may also be transmitted depending on the number of symbols of a PDCCH in a <3,2,2,2,2,3> sTTI pattern. In some scenarios, in a <2,3, 2,2,2,3> sTTI pattern of FIG. 8B, it may be difficult to transmit an sPDCCH due to a PDCCH (e.g., legacy PDCCH) region.

UL Transmission with Repetition

In some systems, for example systems that are compatible with next-generation 5G new radio access technology (RAT), a wider frequency band may be implemented, with support for various services and requirements. As an example, ultra-reliable low-latency communication (URLLC) may be a new RAT (NR) requirement of 3GPP, and may require low-latency and ultra-reliability, e.g., having a user-plane latency of 0.5 ms and X-byte data transmission within 1 ms at an error rate of 10^−5 or less. Generally, in some implementations, enhanced mobile broadband (eMBB) has a large traffic capacity, whereas URLLC traffic has a file size within a few tens to a few hundred bytes and is sporadic. Thus, the eMBB and URLLC may have different characteristics. Therefore, transmission for maximizing transmission rate and minimizing control information overhead is typically utilized for eMBB and transmission having a short scheduling time unit and reliability is typically utilized for URLLC.

A variety of reference time units may be implemented for transmission and reception of physical channels according to an application field or a traffic type. The reference time unit may be a basic unit for scheduling a specific physical channel and may vary with the number of symbols constituting the scheduling unit and/or with a subcarrier spacing (SCS).

In an implementation of the present disclosure, a slot and a mini-slot are described as the reference time unit, for convenience of description. The slot may be, for example, a basic scheduling unit used for normal data traffic (e.g. eMBB). The mini-slot may be a shorter time duration than the slot in the time domain and may be a basic scheduling unit used in traffic or communication schemes for a more special purpose (e.g. in URLLC, unlicensed bands, or millimeter wave). However, the above examples are purely exemplary and implementations of the present disclosure may be applied even to the case in which eMBB transmits and receives a physical channel based on the mini-slot or the case in which URLLC or other communication schemes transmit and receive the physical channel based on the slot.

UL Collision with Repetition

In transmission for traffic requiring a service, such as URLLC, or stricter block error rate (BLER)/latency/reliability, repetition in the time domain may be considered. For example, repetition in units of a TTI/slot/symbol may be applied to a corresponding channel for the purpose of higher reliability (and/or lower latency) of a specific transport block (TB)/code block (CB) (or CB group). Such repetition may be applied to semi-persistence scheduling (SPS) transmission or to PDCCH-less transmission similar to SPS transmission. The repetition may be a type similar to TTI bundling or may be applied in the form of repetition transmission of a grant-free UL channel where a UL channel is transmitted on a resource preconfigured through a higher-layer signal considered in the NR system.

Implementation 1-1

If repetition in units of a TTI/slot/symbol is configured/indicated for a specific TB/CB (group), it may be natural to maintain transmission power of a UE during repetition. Otherwise, an undesirable power transition period may be generated during repetition and there may be restrictions on DMRS bundling/sharing between a plurality of TTIs/slots due to the power transient period when it is desired to perform DMRS bundling/sharing for the purpose of reducing DMRS overhead. However, the UE may be faced with a carrier aggregation (CA) situation, or a power-limited situation which is caused by PUSCHs scheduled by dynamic UL grants on different carriers (e.g., the scenario in which a total transmission power of the UE is greater than a preconfigured specific power value, such as Pcmax) or is generated in a partial TTI/slot/symbol during repetition as in PUSCH/PUCCH simultaneous transmission. Thereby, a situation in which transmission power of the UE inevitably needs to be changed may occur. In this situation, the following UE operations may be implemented.

Option 1: The UE maintains the same power in all TTIs/slots/symbols in which repetition transmission is performed. Herein, in allocating power in the other TTIs/slots/symbols, a scheme different from an existing power allocation rule needs to be applied. As an example, during PUSCH/PUCCH simultaneous transmission, power is generally first allocated to a PUCCH and the remaining power is allocated to a PUSCH. According to Option 1, a rule may be defined such that power is first allocated to the PUSCH for which repetition is performed and the remaining power is allocated to the PUCCH. More generally, a rule may be defined such that the UE first allocates power to the PUSCH for which repetition is performed and power scaling (i.e., power reduction) is performed with respect to the other channels (e.g., the PUCCH and/or a PUSCH scheduled by a UL grant PDCCH).

Option 2: The UE may terminate a repetition operation upon occurrence of a TTI/slot/symbol in which power needs to be changed during repetition. Alternatively, the UE may skip the repetition operation in the corresponding TTI/slot/symbol and then resume repetition.

Option 3: Power change may be permitted in units of a time duration to which DMRS bundling/sharing is to be applied. More specifically, when it is necessary to change power in the first TTI in the time duration to which DMRS bundling/sharing is to be applied, power change may be permitted. However, when it is necessary to change power in a middle TTI rather than the first TTI in the time duration to which DMRS bundling/sharing is to be applied, a rule may be defined such that a channel for which repetition is performed is dropped or a rule may be defined such that power is maintained and a power allocation scheme different from the existing rule is applied as described in Option 1. The channel for which repetition is performed may be dropped only in a TTI in which power needs to be changed within a time duration to which DMRS bundling/sharing is to be applied or may be dropped in all TTIs within the time duration after the TTI in which power needs to be changed within the time duration to which DMRS bundling/sharing is to be applied. Alternatively, the channel for which repetition is performed may be dropped in all TTIs until repetition terminated after the TTI in which power needs to be changed within the time duration to which DMRS bundling/sharing is to be applied.

Option 4: A rule may be defined such that power reduction and/or drop is performed starting from a channel having a low priority among dynamically scheduled PUSCHs in consideration of whether or not a DMRS is included in a TTI, whether or not UCI is accompanied in a corresponding channel, and/or a cell index. The operation of Option 4 may be applied only to other channels except for a PUSCH for which repetition is performed (e.g., a higher priority is assigned to the PUSCH for which repetition is performed) or may be performed only until a non-power-limited situation is satisfied.

Option 5: A rule may be defined such that a PUCCH is dropped and/or a PUSCH is transmitted. In particular, this operation may be applied in order to maintain power of a PUSCH corresponding to repetition although PUSCH/PUCCH simultaneous transmission is configured for the UE. In more particular, a rule may be defined such that the PUCCH is always dropped and/or the PUSCH is transmitted in order to maintain power of the PUSCH corresponding to repetition regardless of a power-limited or non-power-limited situation although PUSCH/PUCCH simultaneous transmission is configured for the UE.

Option 6: If UCI which is to be transmitted through a dynamically scheduled PUSCH is present, a rule may be defined such that the UE piggybacks the UCI on a UL SPS PUSCH and drops the dynamically scheduled PUSCH.

Option 7: The UE may first allocate power to the UL SPS PUSCH and then allocate the remaining power to the dynamically scheduled PUSCH (and/or the PUCCH) so that power of the UL SPS PUSCH is maintained.

Option 8: A rule may be defined such that power reduction and/or drop is performed starting from a channel having a low priority among dynamically scheduled PUSCHs (and/or PUCCHs) in consideration of whether or not a DMRS is included in a TTI, whether or not UCI is accompanied, and/or a cell index. The operation of Option 8 may be applied only to other channels except for a UL SPS PUSCH or may be performed only until a non-power-limited situation is satisfied.

To reduce delay of a UL data channel caused by a scheduling request (SR) and scheduling delay, SPS-based UL transmission or grant-free-based or TTI bundling-based UL transmission may be considered. This may also be a method capable of reducing control overhead (e.g., control channel overhead). For traffic transmission requiring a service, such as URLLC, or stricter BLER/latency/reliability, repetition may also be considered. An operation according to the above options may also be applied to SPS-based or grant-free-based UL repetition transmission.

Implementation 1-2

If repetition in units of a TTI/slot/symbol is configured/indicated for a specific TB/CB (group), a rule may be defined such that a network provides information regarding a time duration to which DMRS bundling/sharing is to be applied to the UE in units of a TTI/slot/symbol. Specifically, the network may allocate a different RS scrambling ID per time duration to which DMRS bundling/sharing is to be applied, provide information regarding phase continuity through DCI, or semi-statically preconfigure the time duration to which DMRS bundling/sharing is to be applied (e.g., through RRC signaling).

An example of a DCI format is shown in Table 5, below. Such a format may be implemented, for example, in systems that are compatible with the 3GPP technical standard TS 36.212, Section 5.3.1.1.22 (describing Format 7-1F).

TABLE 5

DCI format 7-1F is used for the scheduling of one PDSCH codeword with slot or subslot duration in one cell.
The following information is transmitted by means of the DCI format 7-1F:
  The fields of format 7-1A
  DMRS position indicator-1 bit as defined in section 6.10.3.2 (The field is present only if UE is configured with dl-TTI-Length = subslot)
  Antenna port(s), scrambling identity and number of layers-3 bits as specified in Table x.x if the UE is higher layer configured with slotSubslotPDSCH-TXDiv-2layer-TM9/10, Table x.y if the UE is higher layer configured with slotSubslotPDSCH-TXDiv-4layer-TM9/10, or Table 5.3.3.1.22-1 otherwise, where $n_{SCID}$ is the scrambling identity for antenna ports 7 and 8 defined in section 6.10.3.1, or 1 bit as specified in Table 5.3.3.1.5C-6 where $n_{SCID}$ is the scrambling identity for antenna ports 7 and 8 defined in section 6.10.3.1 when higher layer parameter semiOpenLoop is configured.

If blind/HARQ-less PDSCH repetition in units of a TTI/slot/symbol is configured/indicated for a specific TB/CB (group), an eNB may indicate, through DCI in TTI # n, the total number, K, of TTIs in which PDSCH transmission is performed and repeatedly transmit a PDSCH in TTI # n to TTI # n+K−1. Additional DCI may be transmitted in consideration of PDCCH missing of the UE. As an example, even if the UE misses a PDCCH in TTI # n, the network may indicate, through the DCI in TTI # n+1, the total number, K−1, of TTIs in which the PDSCH is transmitted. Upon succeeding in decoding the PDSCH, the UE may receive a corresponding TB in TTI # n+1 to TTI # n+K−1.

In this situation, a problem may arise in that the "DMRS position indicator" field of one bit in Table 5 may be ambiguous. As an example of such a problem, for example, when "DMRS position indicator"=0, interpretation as to in which TTI among TTI # n to TTI # n+K−1 a DMRS is present may be ambiguous. A rule may be defined such that if "DMRS position indicator"=1, the DMRS is present in all TTIs in which the PDSCH is repeatedly transmitted and, if "DMRS position indicator"=0, the DMRS is present only in odd (or even) TTIs among the TTIs in which the PDSCH is repeatedly transmitted. When the eNB transmits additional DCI in TTI # n+1 in consideration of PDCCH missing of the UE, if "DMRS position indicator"=0, it may be impossible to indicate whether the DMRS is present in an odd TTI or an even TTI among the TTIs in which the PDSCH is repeatedly transmitted.

In consideration of such a problem, if blind/HARQ-less PDSCH repetition in units of a TTI/slot/symbol is configured/indicated for a specific TB/CB (group), then a DMRS sharing operation may be undesirable. Accordingly, if blind/HARQ-less PDSCH repetition in units of a TTI/slot/symbol is configured/indicated for a specific TB/CB (group), then a rule may be defined such that the UE reinterprets the DCI field (e.g., DMRS position indicator) indicating whether the DMRS is present as "information about a time duration to which DMRS bundling is to be applied."

In some implementations, DMRS bundling may refer to applying the same precoding within a bundle. As an example, if blind/HARQ-less PDSCH repetition in units of a TTI/slot/symbol is configured/indicated for a specific TB/CB (group), then a specific state of the DCI field indicating whether the DMRS is present may be interpreted as applying DMRS bundling (applying the same precoding) during a time duration corresponding to all TTIs scheduled by DCI. Another state of the DCI field may be interpreted as applying DMRS bundling (applying same precoding) during a half of the time duration corresponding to all TTIs scheduled by the DCI (or during a time which is preset/predefined or configured through signalling).

As another technique, if blind/HARQ-less PDSCH repetition in units of a TTI/slot/symbol is configured/indicated for a specific TB/CB (group), then a rule may be defined such that the UE reinterprets the DCI field (e.g., DMRS position indicator) indicating whether the DMRS is present as "whether DMRS bundling is to be applied". As an example, if blind/HARQ-less PDSCH repetition in units of a TTI/slot/symbol is configured/indicated for a specific TB/CB (group), then a specific state of the DCI field indicating whether the DMRS is present may be interpreted as applying DMRS bundling (applying the same precoding) during a time duration corresponding to all TTIs scheduled by the DCI. Another state of the DCI field may be interpreted as applying different precoding without applying DMRS bundling (i.e. it cannot be assumed that the same precoding is applied to each TTI).

Implementation 1-2a

As another example, a DMRS bundling/sharing operation may be differently (implicitly) defined by the number of repetitions of a PDSCH configured/indicated for the UE. As an example, for the UE for which blind/HARQ-less PDSCH repetition in units of a TTI/slot/symbol is configured/indicated for a specific TB/CB (group), if the number of repetitions is less than a predetermined number (e.g., a total of one or two PDSCHs are transmitted), a rule may be defined such that interpretation of the DMRS position indicator field is maintained as in existing interpretation or the DMRS is transmitted in a corresponding TTI. If the number of repetitions is greater than the predetermined number (e.g., a total of two, three, or more PDSCHs are transmitted), a rule may be defined such that DMRS bundling is applied (i.e., the same precoding is applied) to transmission of all PDSCHs corresponding to repetition or such that DMRS bundling is applied (i.e., the same precoding is applied) per group with respect to TTI groups each consisting of a predefined/signaled number of TTIs. Alternatively, a rule may be defined such that no DMRS bundling is applied (it cannot be assumed that the same precoding is applied to the DMRSs or it is assumed that different precoding is applied).

As used herein, the number of repetitions may refer to the total transmission number of TTIs for a specific TB/CB (group).

Implementation 1-3

In SPS-based or grant-free-based UL transmission, since UL grant DCI for scheduling each individual channel is not present, TPC update may be performed through group-common DCI (e.g., DCI format 3/3A in LTE) for the purpose of closed-loop power adjustment for SPS-based or grant-free-based UL transmission. If repetition is configured/indicated for SPS-based UL transmission or grant-free-based or TTI bundling-based UL transmission, then a TPC update operation may need to be defined.

As an example, a rule may be defined such that TPC information is transmitted in an {i-K_PUSCH}-th TTI and the UE applies the TPC information to an i-th TTI. In such scenarios, if the i-th TTI is a TTI located in the middle of repetition for a specific TB/CB (group), then a rule may be defined such that TPC update (e.g., application of the TPC information) is not applied to all TTIs/slots/symbols in which repetition is performed. In this case, TPC update according to the TPC information may be applied to TTIs starting from a TTI corresponding to the first transmission opportunity after repetition. As another technique, if TPC update is applied to a specific TTI in the middle of repetition, then a rule may be defined such that DMRS bundling/sharing is not applied between the TTI to which TPC update is applied and TTIs before the TPC update is applied.

Implementation 1-4

In SPS-based or grant-free-based UL transmission, a HARQ process ID for initial transmission may be determined by a TTI index.

As an example, in some systems, e.g., systems compatible with LTE, the HARQ process ID for initial transmission may be determined by Equation 1 below.

HARQ process ID=[floor{CURRENT_TTI/semiPersistentSchedIntervalUL}]modulo numberOfConfUlSPS_Processes   Equation 1

In Equation 1, CURRENT_TTI is defined as CURRENT_TTI=[(SFN*10)+subframe number] and may indicate a TTI in which first transmission is performed. A parameter semiPersistentSchedIntervalUL may represent an interval of UL SPS transmission, floor{X} may represent a maximum integer not exceeding X, and a parameter numberOfConfUlSPS_Processes may represent the number of UL SPS processes configured for the UE.

If repetition is configured/indicated for SPS-based UL transmission or grant-free-based or TTI bundling-based UL transmission, then a rule may be defined such that the HARQ process ID for initial transmission is determined by a specific TTI index included in a repetition chunk (e.g., an index of the first TTI in the repetition chunk).

In this case, when transmission in a corresponding TTI included in the repetition chunk (e.g., transmission in a TTI which is a basis for determining the HARQ process ID) is dropped by dynamic scheduling (e.g., non-SPS DCI) or by a traffic/channel/etc. having a higher priority, then a method of determining the HARQ process ID for repetition for SPS-based UL transmission or grant-free-based or TTI bundling-based UL transmission may be implemented as follows.

Option 1: A rule may be defined such that the HARQ process ID is calculated by a specific TTI index of the repetition chunk (e.g., an index of the first TTI in the repetition chunk), regardless of whether transmission/drop is actually performed in a corresponding TTI.

Option 2: A rule may be defined such that the HARQ process ID is calculated by an index of a TTI in which transmission is actually performed. As an example, the HARQ process ID may be determined by an index of the first TTI in which transmission is not dropped among TTIs in the repetition chunk.

Implementation 1-5

If repetition is configured/indicated for UL transmission for a specific TB/CB (group), then an open-loop power control (OLPC) parameter (e.g., P_O or alpha) and/or an incremented or decremented value which is predefined for TPC accumulation may be differently configured according to the number of repetitions of PUSCH/PUCCH transmission.

For example, the UE may determine final transmission power by applying a different OLPC parameter according to a configured/indicated number of repetitions. As another example, the UE may interpret a specific TPC command as a different value according to the configured/indicated number of repetitions.

Implementation 1-6

In TDD, the number of consecutive DL or UL TTIs may be less than a configured/indicated number of repetitions. In this case, if the UE waits until the next transmission opportunity in which the same communication direction is offered, then latency may increase, which may be undesirable in scenarios of strict latency requirements. In the case of dynamic scheduling-based repetition, the eNB may adjust the number of repetitions. However, in the case of semi-static-based repetition, adjusting the number of repetitions may be difficult. Accordingly, in some implementations, if a TTI of a direction that is different from a specific direction (e.g., DL or UL) is present in the middle of repetitions for transmission in that specific direction, then a rule may be defined such that repetition is stopped. In this case, fewer transmissions may be performed as compared to the number of repetitions needed to satisfy specific reliability requirements. As such, if the number of consecutive DL or UL TTIs is less than a configured/indicated number of repetitions, then a rule may be defined such that a larger OLPC parameter (e.g., P_O or alpha) is applied to repetition transmission. An additional incremented or decremented value for TPC accumulation may be defined for the case in which the number of consecutive DL or UL TTIs is less than a configured/indicated number of repetitions.

As another technique, if TTI(s) of a direction different from a specific direction are present in the middle of repetition for transmission in the specific direction (DL or UL), then a rule may be defined such that whether to continue to perform repetition or stop repetition is determined by determining whether a gap generated by the TTI(s) is within a coherence time which is sufficient to apply DMRS bundling/sharing. As an example, if it is determined that performance may be degraded when DMRS bundling is performed due to the gap caused by TTIs of different directions, then the UE may stop repetition and, if not, then the UE may continue to perform repetition. A maximum gap which is a criterion for determination may be predefined in units of a TTI/slot/symbol or may be configured/indicated through a higher layer signal or a physical layer signal.

Implementation 1-6a

As another technique, if TTI(s) of a second direction different from a first direction are present in the middle of repetition for transmission in the first direction (DL or UL), (e.g., UL, a special subframe, a short TTI in the special subframe, a part of the special subframe, and/or a UpPTS is present in the middle of repetition for DL transmission), then a rule may be defined such that repetition is resumed in a TTI of the first direction except for the TTI(s) of the second direction.

As an example, consider a scenario in which transmission directions {D,D,D,S,U,D,D} are configured/indicated for a specific time duration (where "D" refers to DL, "U" refers to UL, and "S" refers to a special subframe or a short TTI in the special subframe). If DL repetition is started in the first TTI and a total of 4 DL transmissions should be performed, then a rule may be defined such that the UE performs the first three DL transmissions and the sixth DL transmission except for S and/or U.

As another technique, if TTI(s) of a second direction different from a first direction are present in the middle of repetition for transmission in the first direction (DL or UL), then a determination of whether repetition will be stopped or whether the time duration corresponding to the TTI(s) of the second direction will be skipped and repetition transmission will be resumed may be determined according to a time duration corresponding to TTI(s) of the second direction. As an example, if the time duration corresponding to TTI(s) of the second direction is a predetermined length or more, then repetition may be stopped and, if the time duration corresponding to TTI(s) of the second direction is less than the predetermined length, then the time duration corresponding to TTI(s) of the second direction may be skipped and repetition transmission may be resumed.

As another technique, if TTI(s) of a second direction different from a first direction are present in the middle of repetitions for transmission in the first direction (DL or UL), then a determination of whether repetition will be stopped or whether the time duration corresponding to the TTI(s) of the second direction will be skipped and repetition transmission will be resumed may be determined according to a TTI length. As an example, for a TTI length (e.g., a subframe) corresponding to a specific length or more, repetition may be stopped because latency may excessively increase and, for a TTI length (e.g., a slot) corresponding to the specific length or less, a time duration corresponding to TTI(s) of the second direction may be skipped and repetition transmission may be resumed.

In Implementation 1-6 and Implementation 1-6a, a special subframe or a short TTI belonging to the special subframe may be either DL or UL according to the length of a downlink pilot time slot (DwPTS) or an uplink pilot time slot (UpPTS) (or the number of symbols in which DL/UL transmission is actually performed in a TTI). Alternatively, the special subframe or the short TTI may always correspond to transmission in a direction different from a repeated channel direction regardless of the length of the DwPTS or UpPTS so that the special subframe or the short TTI may be disregarded during count of the number of repetition TTIs or repetition may be terminated/stopped in the special subframe or the short TTI.

As an example, if a slot-TTI is configured, then a determination of whether PDSCH transmission is supported in the second slot in a subframe is determined according to the length of the DwPTS. A rule may be defined such that a slot-TTI in which PDSCH transmission is not supported (e.g., the second slot of the DwPTS if special subframe configuration 1/2/6/7 is configured) is disregarded when the number of repetition TTIs is counted, whereas a slot-TTI in which PDSCH transmission is supported (e.g., the second slot of the DwPTS if special subframe configuration 3/4/8 is configured) is included when the number of repetition TTIs is counted such that a PDSCH which is being repeatedly transmitted is received.

Implementation 1-7

In some scenarios, to improve UL channel estimation performance, repetition of sounding reference signal (SRS) transmission may be implemented. In particular, the network may trigger repetition transmission of an SRS through one DCI. At least one of information regarding the number of SRS repetitions, a TTI/slot/symbol in which SRS transmission is started, a TTI/slot/symbol in which SRS transmission is terminated, a length to be repeated from an SRS transmission start timing, or SRS transmission bandwidth may be predefined or may be configured/indicated through a higher/physical layer signal.

In more particular, while the SRS is repeatedly transmitted, an SRS transmission resource may be differently determined according to a TTI/slot/symbol-basis on the frequency axis according to a pattern which is predefined or is configured/indicated through a higher/physical layer signal. In some scenarios, this may enable SRS transmission on a wider frequency resource.

In scenarios where SRS repetition transmission is supported, an OLPC parameter (e.g., P_O or alpha) for the SRS and/or an incremented/decremented value predefined for TPC accumulation may be differently configured according to the number of SRS repetitions and/or SRS transmission bandwidth (i.e., the number of RBs). In addition, when SRS repetition transmission is supported, a P_SRS_offset value may be differently configured according to the number of SRS repetitions and/or SRS transmission bandwidth (i.e., the number of RBs).

Implementation 1-8

In scenarios where repetition in units of TTIs/slots/symbols is configured for a PUCCH, a situation in which an additional HARQ-ACK (or CSI) is transmitted or in which a PUSCH is triggered/scheduled (for a UE that cannot perform PUCCH/PUSCH simultaneous transmission), in the middle of repetition, may be considered. If the above operation is not permitted, then DL data transmission that requires HARQ-ACK transmission at a timing in the middle of PUCCH repetition may not be possible.

Option 1: If UCI should be additionally transmitted during PUCCH repetition, then a PUCCH format may be differently switched according to payload. In particular, information regarding an OLPC parameter (e.g., P_O or alpha) and/or an incremented/decremented value predefined for TPC accumulation, which is different from a parameter and/or a value in the case in which the UCI is not added, may be predefined or may be configured for the UE through a higher layer signal.

Option 2: Addition of the UCI may be optionally permitted and the UE may transmit the added UCI through the PUCCH. The added UCI may correspond to a target service, quality of service (QoS), BLER requirements, reliability requirements, latency requirements, TTI length, and/or numerology of a higher priority. In addition, addition of UCI corresponding to a high priority may first be permitted only in a situation in which addition of the UCI does not cause PUCCH format switching.

Option 3: If HARQ-ACK should be additionally transmitted during PUCCH repetition, then HARQ-ACK bundling in the spatial/time/carrier/frequency domain may be applied to the added HARQ-ACK.

Option 4: If the UCI should be additionally transmitted during PUCCH repetition, then a determination of whether the UCI is added may be determined according to an added UCI type. In particular, a rule may be defined such that HARQ-ACK is added to a specific TTI during PUCCH repetition and CSI is dropped without being added.

Option 5: If PUSCH scheduling is performed during PUCCH repetition, then a rule may be defined such that the UE drops a PUCCH in a corresponding TTI and piggybacks, on a PUSCH, UCI carried on the PUCCH.

Whether the above options are implemented may differ according to changes in the transmission power of the PUCCH (e.g., whether the power is less than a threshold value, which may be predefined or configured/indicated through higher/physical layer signals). As an example, if the PUCCH transmission power is changed by greater than a predetermined level, then additional UCI transmission may not be permitted, and only PUCCH repetition may be performed.

Implementation 1-9

The UE may report, to the eNB, various types of information about capabilities of the UE. Such information may indicate, for example, whether the UE can receive, at the same time, a plurality of (unicast) PDSCHs having the same TTI length and/or numerology. For example, the plural PDSCHs may have different target services, QoS, BLER requirements, reliability requirements, and/or latency requirements. In this case, the UE may be configured to receive/store the PDSCHs in different buffers and to demodulate/decode the PDSCHs. In some implementations, this operation may be restrictively supported in that a total sum of TB sizes of the plural PDSCHs should be less than or equal to a maximum supportable TB size of the UE. To support this operation, another restriction may be implemented, in that a total sum of layers for the plural PDSCHs should be less than or equal to the maximum number of spatial layers originally supportable by the UE. In some implementations, the eNB may signal a higher layer signal for this operation to the UE.

Implementation 1-10

In scenarios where repetition is configured/indicated for UL transmission that is SPS-based, or grant-free-based, or TTI bundling-based (e.g., PUSCH), if transmission corresponding to repetition overlaps with an initial transmission timing that is SPS-based, or grant-free-based, or TTI bundling-based, then a rule may be defined such that a higher priority is assigned to transmission corresponding to repetition. In such scenarios, the initial transmission that is SPS-based, or grant-free-based, or TTI bundling-based may be dropped or a lower priority may be assigned thereto during power allocation. In this case, a rule may be defined such that the dropped initial transmission that is SPS-based, or grant-free-based, or TTI bundling-based is performed in the next SPS transmission opportunity.

In some implementations, the above rule may be implemented only when the number of repetitions is less than a threshold, or only when the number of times of dropping the initial transmission that is SPS-based, or grant-free-based, or TTI bundling-based (or the number of times that power is reduced due to transmission corresponding to repetition) is less than a threshold. For example, if the number of repetitions exceeds a threshold, or if the number of times of dropping the initial transmission that is SPS-based, or grant-free-based, or TTI bundling-based exceeds a threshold, or if the number of times of reducing power due to transmission corresponding to repetition exceeds a threshold, then a rule may be defined such that repetition is stopped and the initial transmission that is SPS-based, or grant-free-based, or TTI bundling-based is performed.

Implementation 1-11

In scenarios where repetition is configured/indicated for SPS-based or grant-free-based UL transmission, if transmission corresponding to repetition overlaps with an initial transmission timing that is SPS-based, or a grant-free-based, or TTI bundling-based, then then a rule may be defined such that repetition is immediately stopped and the initial transmission is performed. As such, a higher priority may be given to latency rather than reliability of UL transmission.

Implementation 1-12

In scenarios where repetition is configured/indicated for SPS-based or grant-free-based UL transmission, if transmission corresponding to repetition overlaps with an initial transmission timing that is SPS-based, or grant-free-based, or TTI bundling-based, then both repetition transmission and initial transmission may be performed in the same TTI. In some scenarios, this may serve to reduce degradation of both latency and reliability performance. In some implementations, if the UE performs both initial transmission and repetition transmission, then respective coded symbols (e.g., modulation symbols) corresponding to initial transmission and repetition transmission may be mapped onto preallocated resources for SPS transmission. However, in some scenarios, this may cause a total code rate to increase and a decoding performance to worsen.

Accordingly, in some implementations, the network may preconfigure or pre-reserve an additional resource for the UE through a higher layer signal so that other resources may be additionally used for a resource configured for SPS or grant-free or TTI bundling. If the added resource is separated from a preconfigured resource on the frequency axis, then a peak-to-average-power-ratio (PAPR) performance of the UE may be affected. Therefore, in some implementations, the added resource may be limited to be configured (or implicitly preset in advance) to be contiguous with (e.g., not separated from) the preconfigured resource.

As another technique, the additional resource to be used in the above case may be preconfigured for the UE through a higher layer signal. In scenarios where repetition is configured/indicated for UL transmission that is SPS-based, or grant-free-based, or TTI bundling-based, if transmission corresponding to repetition overlaps with an initial transmission timing that is SPS-based, or grant-free-based, or TTI bundling-based, then the UE may map both the repetition transmission and the initial transmission to the additionally configured resource.

As another technique, UL transmission power used in the above scenario may be additionally preset or may be configured for the UE through a higher layer signal. As a specific example, an offset for UL transmission power which is to be applied to original repetition transmission and/or initial transmission may be preset or may be configured through the higher layer signal.

Implementation 1-13

In scenarios where repetition is configured/indicated for UL transmission that is SPS-based or grant-free-based, the number of repetitions of transmission may be configured to be large, e.g., such that repetition transmission of a current transmission opportunity may collide with the next transmission opportunity determined by an SPS/grant-free periodicity. As an example, an SPS periodicity may be one TTI and, simultaneously, four repetitions may be configured for each transmission. In some systems, e.g., systems that are compatible with LTE, a HARQ ID for current UL SPS initial transmission is determined as shown in the example of Table 6 below (3GPP technical standard TS 36.321 V 15.1.0 may be referenced).

TABLE 6 if the UE is not configured with short TTI in UL for the SpCell:
    HARQ Process ID = [floor(CURRENT_TTI/semiPersistSched-
    IntervalUL)] modulo numberOfConfUISPS-Processes,
    where CURRENT_TTI = (SFN * 10) + subframe number] and it
    refers to the subframe where the first transmission of a bundle
    takes place.
else, the HARQ Process ID associated with this TTI is derived from
the following equation:
    HARQ Process ID = [floor(CURRENT_TTI/semiPersistSched-
    IntervalUL-sTTI)] modulo numberOfConfUISPS-Processes-sTTI,
    where CURRENT_TTI = [(SFN * 10 * sTTI_Number_Per_Subframe) +
    subframe number * sTTI_Number_Per_Subframe + sTTI number] and
    it refers to the short TTI occasion where the first transmission of a
    bundle takes place. Refer to 5.10.2 for sTTI_Number_Per_
    Subframe and sTTI number.

According to an implementation of the present disclosure, in scenarios where repetition is configured/indicated for SPS-based or grant-free-based UL transmission, a rule may be defined such that the number of repetitions is also considered to determine the HARQ ID. For example, the HARQ ID may be determined as shown in Table 7 below (3GPP technical standard TS 36.321 V 15.1.0 may be referenced).

TABLE 7 if the UE is not configured with short TTI in UL for the SpCell:
    HARQ Process ID = [floor(CURRENT_TTI/max{semiPersistSched-
    IntervalUL, repetition number for SPS})] modulo numberOf-
    ConfUISPS-Processes,
    where CURRENT_TTI = (SFN * 10) + subframe number] and it
    refers to the subframe where the first transmission of a bundle
    takes place.
else, the HARQ Process ID associated with this TTI is derived from the
following equation:
    HARQ Process ID = [floor(CURRENT_TTI/max{semiPersistSched-
    IntervalUL-sTTI, repetition number for SPS})] modulo numberOf-
    ConfUISPS-Processes-sTTI,
    where CURRENT_TTI = [(SFN * 10 * sTTI_Number_Per_Subframe) +
    subframe number * sTTI_Number_Per_Subframe + sTTI number] and
    it refers to the short TTI occasion where the first transmission of a
    bundle takes place. Refer to 5.10.2 for sTTI_Number_Per_Subframe
    and sTTI number.

The example of Table 7 may, in some scenarios, be effective as a method in which HARQ IDs of transmissions corresponding to repetition do not vary when repetition transmission is prioritized and when an SPS/grant-free periodicity and the number of repetitions are configured such that the next transmission opportunity determined by the SPS/grant-free periodicity collides with repetition transmission.

Implementation 1-14

In scenarios where repetition is configured/indicated for UL transmission that is SPS-based, or grant-free-based, or TTI bundling-based, a TTI in which initial transmission of UL transmission is started may be determined according to a transmission periodicity and the number of repetitions.

Figure 9:
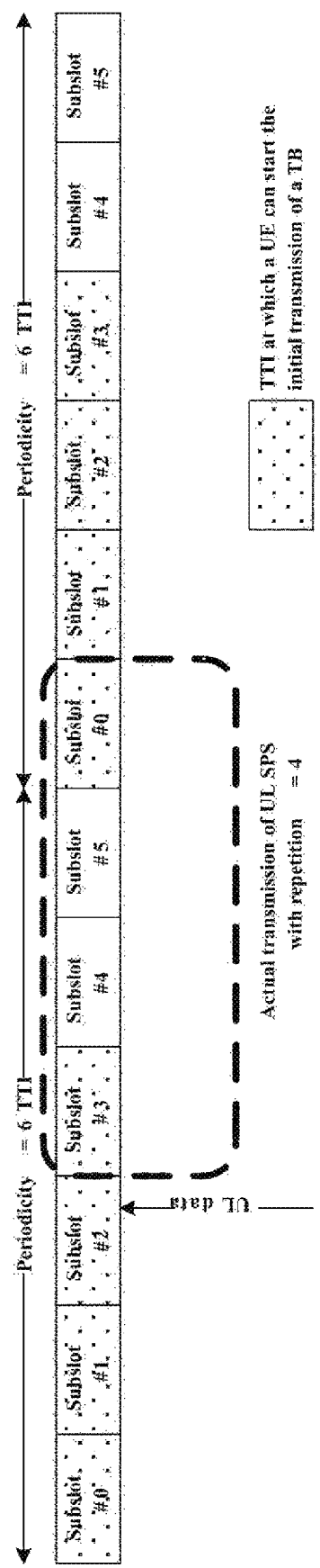
FIG. 9 shows an example of determining a TTI in which UL initial transmission is started.

FIG. 9 shows an example of determining a TTI in which UL initial transmission is started. As an example, a UE for which a periodicity is 6 TTIs and the number of repetitions is 4 may start UL initial transmission only in the first four subslots of each subframe. That is, when a transmission periodicity is longer than the number of repetitions, UL initial transmission may be started only in a partial TTI. In this case, according to some implementations, a rule may be defined such that UL transmission corresponding to actual repetition is permitted even in a TTI in which initial transmission cannot be started in order to achieve transmission of a configured/indicated number of repetitions. In some scenarios, this may better ensure reliability of a TB transmitted by repetition.

Implementation 1-15

In scenarios where repetition is configured/indicated for UL transmission that is SPS-based or grant-free-based, repetition transmission corresponding to a repetition bundle may be started at the middle of a specific period duration, and the number of repetitions may not be filled within the period duration. In this case, if the eNB fails to correctly decode an initial transmission of the repetition transmission, then a problem may arise in which the UE and the eNB recognize a HARQ process ID as different values.

Figure 10:
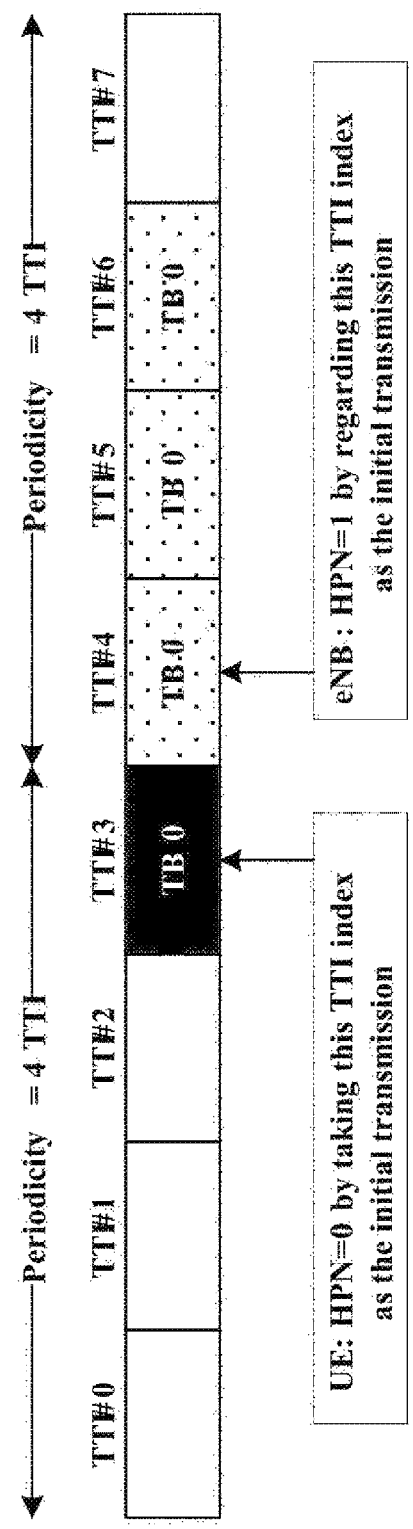
FIG. 10 shows an example of a timeline of a HARQ process ID of a UE and an eNB.

FIG. 10 shows an example of a timeline of a HARQ process ID of a UE and an eNB.

In this example, in a situation in which the number of HARQ processes configured for UL SPS is 8, a periodicity is 4, and a HARQ process ID is determined by a TTI index and/or an SPS periodicity (e.g., HARQ Process ID=[floor (CURRENT_TTI/semiPersistSchedIntervalUL)]modulo numberOfConfUlSPS-Processes), the UE starts transmission in TTI #3, whereas the eNB may recognize that transmission is started in TTI #4, as illustrated in FIG. 10. Then, the UE understands the HARQ process ID as 0, whereas the eNB understands the HARQ process ID for a corresponding TB as 1.

Accordingly, the following techniques may be implemented so that the eNB may be aware of whether a PUSCH transmitted in a specific TTI corresponds to initial transmission (so as to derive the same HARQ process ID understood by the UE).

Option 1: The UE may transmit, in a PUSCH, information as to whether the PUSCH corresponds to initial transmission or not. Alternatively, the UE may transmit, in the PUSCH, information about a transmission order of the PUSCH among repetition transmissions.

Option 2: A root index of a DMRS sequence may be differently configured/preset according to each TTI (group) of repetition. As an example, delta_ss in a sequence-shift pattern f_ss=(N_ID^cell+delta_ss) mod 30 of the PUSCH may be configured through a higher layer signal. delta_ss may be differently configured according to whether the PUSCH corresponds to initial transmission or a predefined/signaled offset may be applied. Alternatively, delta_ss may be differently configured according to a transmission order among repetition transmissions or a predefined/signaled offset may be applied. As another technique, whether a predefined/signaled offset is applied to f_ss may be determined according to whether the PUSCH corresponds to initial transmission or according to a transmission order among repetition transmissions.

Option 3: An RV may be differently determined according to a transmission order among repetition transmissions. For example, if x=0, 1, 2, 3 for an {x mod 4}-th transmission of repetition transmissions, then RV={0, 2, 3, 1} may be determined.

Option 4: A rule may be defined such that different frequency resources are used for initial transmissions as compared to other transmissions among repetition transmissions. In particular, a rule may be defined such that an initial transmission uses a resource indicated by activation DCI, whereas other transmissions use a resource to which a defined/signaled offset is applied or vice versa.

Option 5: If a HARQ process ID of UL SPS transmission for which repetition is configured is determined by information such as the first initial transmission TTI index of repetition, then a rule may be defined such that each DMRS resource (e.g., DMRS cyclic shift) is used for repetition transmission by tying each HARQ process ID to the DMRS resource.

Figure 11:
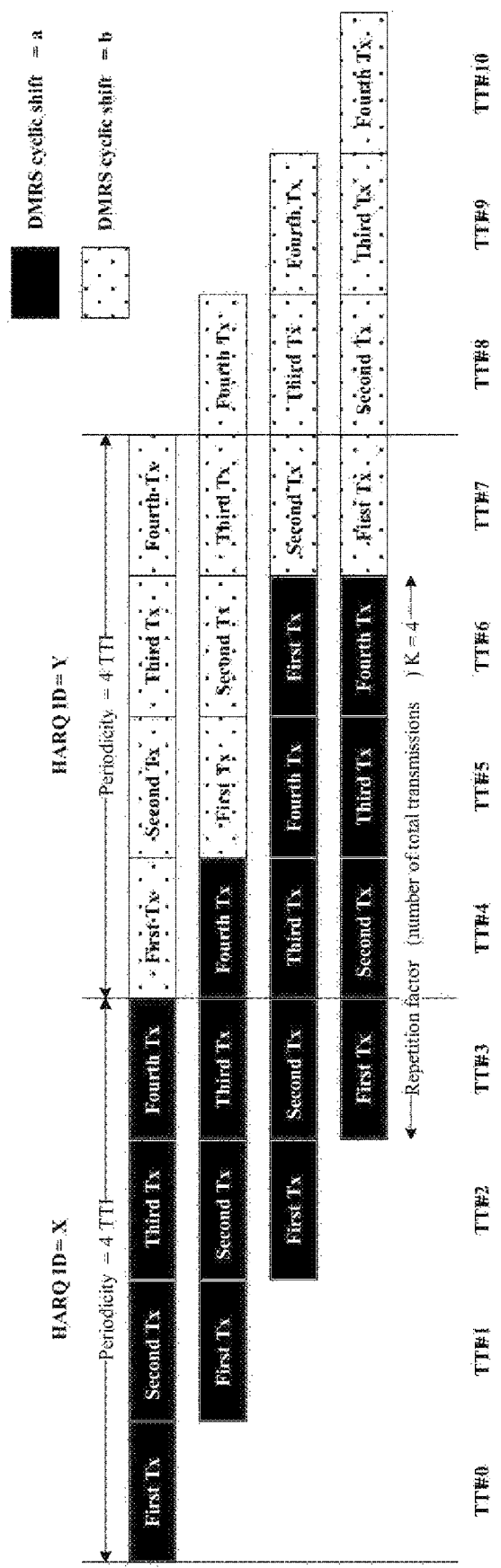
FIG. 11 is a diagram showing an example of determination of a HARQ process ID.

FIG. 11 is a diagram of an example of determination of a HARQ process ID according to Option 5, above.

In scenarios where periodicity of an SPS is 4 TTIs and a repetition factor (i.e., the total number of transmissions for a repetition bundle) is 4 TTIs, the UE may perform transmission corresponding to the same HARQ process ID using the same DMRS cyclic shift. If repetition transmission is performed in TTIs #3, 4, 5, and 6, then the UE may assume that the HARQ process ID=X, whereas, if the eNB does not successfully receive TTI #3, then the eNB may assume that the HARQ process ID=Y. However, in scenarios where the UE performs transmission using DMRS cyclic shift=a, which is associated with HARQ process ID=X, the eNB may be aware that the HARQ process ID=X. In particular, (assuming that a repetition factor is less than or equal to an SPS periodicity) repetition transmission for one TB will be performed in TTIs in which at most two HARQ process IDs are derived. Then, a rule may be defined such that one DMRS cyclic shift is configured for an even-numbered HARQ process ID and another DMRS cyclic shift is configured for an odd-numbered HARQ process ID.

Implementation 1-16

In some systems, e.g., systems that are compatible with LTE, in scenarios of UL SPS, a specific indicator (e.g., 1-bit indication) may indicate whether a DMRS is always present within a TTI.

As shown in the example of Table 8, below, when a state of an sDCI field is "1", this may indicate that DMRS sharing is implemented and, when the state of the sDCI field is "0", this may indicate that DMRS sharing is not used.

If DMRS sharing is used, then transmission of the DMRS for UL data in the first sTTI (e.g., sub-slot) in which the UL data (e.g., sub-slot SPS PUSCH) is transmitted may not be guaranteed. In this case, the DMRS transmitted in the subsequent second sTTI may be used for the UL data transmitted in the first sTTI. The first sTTI and the second sTTI may be understood as sharing the DMRS.

In the example of Table 8, the sDCI field is one bit. However, this is merely exemplary and the present disclosure is not limited thereto, as the sDCI field may be configured as 2 bits or 3 or more bits. In addition, the sDCI field may be referred to by other field names. For example, as described in the example of Table 9 below, the sDCI field of Table 8 may also be referred to as a DMRS pattern field.

Referring to Table 8, sTTI 0 is configured as 3 symbols, sTTI 1 is configured as 2 symbols, sTTI 2 is configured as 2 symbols, sTTI 3 is configured as 2 symbols, sTTI 4 is configured as 2 symbols, and sTTI 5 is configured as 3 symbols. sTTI 0 to sTTI 5 correspond to one subframe.

For example, if DMRS sharing is configured (e.g., sDCI field=1), then the DMRS is not present in sTTI 1 (D D|R). The DMRS for UL data transmitted in sTTI 1 is transmitted in sTTI 2 beyond an sTTI border.

TABLE 8

| sDCI field (1-bit) | sTTI 0 | sTTI 1 | sTTI 2 | sTTI 3 | sTTI 4 | sTTI 5 |
|---|---|---|---|---|---|---|
| 0 (no sharing) | R D D | R D | R D | R D | R D | R D D |
| 1 | R D D | D D \| R | R D | D D \| R | R D | R D D |

R: Reference symbol
D: Data
|: sTTI border

Table 9 shows an example of DMRS mapping. Such a mapping may be implemented, for example, in systems that are compliant with 3GPP technical standard TS 36.211 V 15.1.0, Section 5.5.2.1.

TABLE 9

In case of subslot-PUSCH, the mapping to resource elements (k,l), in the subframe shall be in increasing order of first k for all values of k, except if the Cyclic Shift Field mapping table for DMRS bit field is set in the most recent uplink-related DCI format 7, which indicates the use of Table 5.5.2.1.1-4. In this case the mapping to resource element shall be in increasing order of first k only for values of k satisfying k mod 2 = $\overline{\omega}$.
The
value of l depends on the uplink subslot number and the DMRS-pattern field in the most recent uplink-related DCI, according to Table 5.5.2.1.2-1, or according to Table 5.5.2.1.2-2 in case of semi-persistent scheduling of sub slot-PUSCH (i.e. higher layer patameter sps-ConfigUL-sTTI-r15 is configured, see 3GPP TS 36.331 and with a configured periodicity of 1 subslot (i.e. semiPersistSchedIntervalUL-STTI-r15 set to sTTI1). In case of subslot-PUSCH and semi-persistent scheduling with a configured periodicity longer than 1 subslot, the mapping shall start at symbol l according to the first row of Table 5.5.2.1.2-2 (i.e. equivalent to a signalling of DMRS-pattern field set to '00'). In case no value of l is defined for the uplink subslot number, and in case no valid starting symbol index (see table 5.3.4-1), no reference signal is transmitted associated with the uplink-related DCI format.

Table 10 is Table 5.5.2.1.2-1 mentioned in Table 9, which shows the quantity/for subslot-PUSCH.

TABLE 10

| DMRS-pattern field in | Uplink subslot number | | | | | |
|---|---|---|---|---|---|---|
| uplink-related DCI format | #0 | #1 | #2 | #3 | #4 | #5 |
| 00 | 0 | 3 | 5 | 0 | 2 | 4 |
| 01 | 2 | 4 | — | 1 | 3 | — |
| 10 | — | — | — | 2 | — | — |
| 11 | — | 5 | — | — | 4 | — |

Table 11 is Table 5.5.2.1.2-2 mentioned in Table 9, which shows the quantity/for subslot-PUSCH for semi-persistent scheduling.

TABLE 11

| DMRS-pattern field in | Uplink subslot number | | | | | |
|---|---|---|---|---|---|---|
| uplink-related DCI format | #0 | #1 | #2 | #3 | #4 | #5 |
| 00 | 0 | 3 | 5 | 0 | 2 | 4 |
| 10 | 0 | 5 | 5 | 2 | 2 | 4 |

In the example of Table 9, with regard to RE(k,l), the variable k represents a subcarrier index to which the DMRS is mapped and the variable l represents a symbol index to which the DMRS is mapped. The symbol index may indicate the location of a corresponding symbol within one slot. For example, when it is assumed that subslots #0, #1, and #2 constitute slot #0 and subslots #3, #4, and #5 constitute slot #1, then symbol l=0 in slot #0 is included in subslot #0 and symbol l=0 within slot #1 is included in subslot #3. In Table 9, the number of symbols included in each subslot may be equal to the number of symbols included in the sTTI described with reference to Table 8.

Referring to Table 5.5.2.1.2-2 in Table 9, for a subslot PUSCH for SPS, the DMRS pattern field=00 may be interpreted as non-use of DMRS sharing, and the DMRS pattern field=10 may be interpreted as use of DMRS sharing.

Specifically, referring to DMRS pattern field=00 of Table 5.5.2.1.2-2, the DMRS for subslot #0 is transmitted in symbol #0 included in subslot #0, the DMRS for subslot #1 is transmitted in symbol #3 included in subslot #1, the DMRS for subslot #2 is transmitted in symbol #5 included in subslot #2, the DMRS for subslot #3 is transmitted in symbol #0 included in subslot #3 (i.e., the first symbol in the second slot), the DMRS for subslot #4 is transmitted in symbol #2 included in subslot #4, and the DMRS for subslot #5 is transmitted in symbol #4 included in subslot #5.

Referring to DMRS pattern field=10 of Table 5.5.2.1.2-2, the DMRS for subslot #0 is transmitted in symbol #0 included in subslot #0, the DMRS for subslot #1 is transmitted in symbol #5 included in subslot #2 (i.e., DMRS sharing), the DMRS for subslot #2 is transmitted in symbol #5 included in subslot #2, the DMRS for subslot #3 is transmitted in symbol #2 included in subslot #4 (i.e., symbol #2 in the second slot) (i.e., DMRS sharing), the DMRS for subslot #4 is transmitted in symbol #2 included in subslot #4, and the DMRS for subslot #5 is transmitted in symbol #4 included in subslot #5.

In the example of Table 9, referring to the sentence "The value of l depends on the uplink subslot number and the DMRS-pattern field in the most recent uplink-related DCI, according to Table 5.5.2.1.2-1, or according to Table 5.5.2.1.2-2 in case of semi-persistent scheduling of subslot-PUSCH and with a configured periodicity of 1 subslot," in some implementations, an index of a symbol to which the DMRS is mapped is determined based on a DMRS pattern field of DCI when an SPS periodicity is one subslot. For example, if DMRS sharing is usable, then this may be interpreted as subslot SPS PUSCH transmission in which the SPS periodicity is one subslot.

In this context, referring to the sentence "In case of subslot-PUSCH and semi-persistent scheduling with a configured periodicity longer than 1 subslot, the mapping shall start at symbol l according to the first row of Table 5.5.2.1.2-2" of Table 9, subslot SPS PUSCH transmission in which the SPS periodicity exceeds one subslot may be interpreted as non-application of DMRS sharing (i.e., DMRS transmission which is the same as DMRS pattern field=00).

Based on the description of Table 9, it may be appreciated by those skilled in the art that the SPS periodicity of a subslot PUSCH to which SPS is applied is one subslot, even in examples related to the above description and DMRS sharing described later unless specially described otherwise.

In this situation, if the UE performs PUSCH and PUCCH simultaneous transmission, then a problem may arise in that a PUCCH transmission may overlap in time with a UL SPS PUSCH transmission. Thus, if the UE is faced with a power-limited situation, such an overlap may affect demodulation performance caused by DMRS sharing in terms of the eNB. In DMRS sharing, channel estimation is performed using the DMRS, and the DMRS is utilized to demodulate a plurality of data channels. In this case, if powers of the data channels become different, then demodulation performance may be degraded.

In scenarios where the UE performs PUSCH and PUCCH simultaneous transmission, if DMRS sharing for a UL SPS PUSCH is indicated (e.g., DMRS-pattern field='10' in Table 5.5.2.1.2-2) and if the PUCCH transmission overlaps in time with UL SPS PUSCH transmission (e.g., so that the UE may be faced with a power-limited situation in which, for example, a total transmission power of the UE is greater than a preset specific power value, e.g., Pcmax), then the following UE operations may be implemented.

Option 1: A rule may be defined such that UCI to be transmitted through a PUCCH is instead piggybacked on a PUSCH, and the PUCCH is dropped. For example, even in scenarios where the UE is configured to perform PUCCH/PUSCH simultaneous transmission, the UE may drop the PUCCH and instead transmit the UCI by piggybacking the UCI on the PUSCH. In some implementations, the eNB may determine that the UE will drop the PUCCH (even though PUCCH/PUSCH simultaneous transmission is configured for the UE) and the eNB may receive the piggybacked UCI through the PUSCH from the UE. Herein, the PUSCH on which the UCI is piggybacked may be a UL SPS transmission PUSCH, for example. As described earlier, the UL SPS transmission PUSCH may have a length of a sub-slot TTI, in some implementations. Alternatively, in some implementations, the PUSCH on which the UCI is piggybacked may be a PUSCH selected according to priority levels (e.g., a PUSCH with a lowest cell index and/or with a DMRS within a PUCCH/cell group). More generally, in some implementations, a rule may be defined such that the PUCCH is always dropped and/or the UL SPS PUSCH (e.g., an SPS PUSCH on which the UCI is piggybacked) is transmitted. As such, in some scenarios, such techniques may enable DMRS sharing by maintaining power of the PUSCH corresponding to repetition even in scenarios where PUSCH/PUCCH simultaneous transmission is configured for the UE, and regardless of whether or not the UE encounters a power-limited situation.

Option 2: The UE may first allocate power of the UL SPS PUSCH so that power is maintained and then allocate the remaining power to the PUCCH.

Option 3: The UE transmits the DMRS in a TTI in which a subslot-PUSCH corresponding to UL SPS is transmitted. The UE may regard the corresponding TTI as DMRS-pattern field='00' (in Table 5.5.2.1.2-2) and transmit a UL-SCH and/or the DMRS. This operation may have a minimized effect on demodulation performance even if power of the UL SPS PUSCH is changed because the DMRS is also transmitted.

Option 4: The PUCCH is dropped and UCI to be transmitted through the PUCCH (e.g., HARQ-ACK) is also dropped. This serves to minimize performance degradation caused by puncturing when HARQ-ACK is mapped to the PUSCH.

Similarly, if a dynamically scheduled PUSCH overlaps in time in a cell different from a cell in which a UL SPS PUSCH is transmitted and thus the UE is faced with a power-limited situation, this may also affect demodulation performance caused by DMRS sharing in terms of the eNB. If DMRS sharing for the UL SPS PUSCH is indicated (e.g., DMRS-pattern field='10' in Table 5.5.2.1.2-2), the dynamically scheduled PUSCH and/or the PUCCH overlaps in time in a cell different from a cell in which the UL SPS PUSCH is transmitted, and thus the UE is faced with a power-limited situation (i.e. a total transmission power of the UE is greater than a preset specific power value, e.g., Pcmax), the following UE behavior may be defined.

Option 1: A rule may be defined such that, if UCI to be transmitted through the dynamically scheduled PUSCH is present, the UE piggybacks the UCI on the UL SPS PUSCH and drops the dynamically scheduled PUSCH.

Option 2: The UE may first allocate power of the UL SPS PUSCH so that power is maintained and then allocate the remaining power to the dynamically scheduled PUSCH (and/or PUCCH).

Option 3: If the UCI is included in the dynamically scheduled PUSCH, the UE may first allocate power to the dynamically scheduled PUSCH and then allocate the remaining power to the UL SPS PUSCH.

Option 4: A rule may be defined such that power reduction and/or drop is performed sequentially from a channel having a low priority among dynamically scheduled PUSCHs (and/or PUCCHs) in consideration of whether the DMRS is included in a TTI, the UCI is accompanied, and/or a cell index. This operation may be applied only to other channels except for the UL SPS PUSCH and may be performed until a non-power-limited condition is satisfied.

Option 5: The UE transmits the DMRS in a TTI in which a subslot-PUSCH corresponding to UL SPS is transmitted. The UE may regard the corresponding TTI as DMRS-pattern field='00' (in Table 5.5.2.1.2-2) and transmit the UL-SCH and/or the DMRS. This operation may have a minimized effect on demodulation performance even if power of the UL SPS PUSCH is changed because the DMRS is also transmitted.

Implementation 1-17

If a HARQ process ID of UL SPS transmission for which repetition is configured is determined by information such as the first initial transmission TTI index of repetition, it may be important for the eNB to be aware of first transmission of repetition. To this end, if the eNB should distinguish between HARQ process IDs through a DMRS resource (e.g., DMRS cyclic shift) as in Option 5 of Implementation 1-15, it may be important for the UE to transmit the DMRS in every transmission. Therefore, in UL SPS transmission for which repetition is configured/indicated (particularly, subslot UL SPS with a periodicity of one TTI), a rule may be defined such that the UE transmits the DMRS in every TTI. That is, in UL SPS transmission for which repetition is configured/indicated (particularly, subslot UL SPS with a periodicity of one TTI), a rule may be defined such that the UE regards a corresponding TTI as DMRS-pattern field='00' (in Table 5.5.2.1.2-2 in TS 36.211) and transmit the UL-SCH and/or DMRS in all TTIs in which repetition is performed.

Implementation 1-18

When a plurality of SPSs (can be configured for a specific serving cell, if transmissions based on different SPS configurations have the same HARQ process ID, the eNB may combine transmissions based on different SPS configurations and store the combined transmission in a buffer, thereby causing an undesirable result.

To prevent this problem, a rule may be defined such that a set of different HARQ process IDs is applied to a plurality of SPS configurations for a specific serving cell. As one method, the maximum number of HARQ processes for SPS configured for the UE may be assigned to respective SPS configurations according to a predefined or signaled ratio/number. As an example, if the maximum number of HARQ processes is set to 8 and HARQ process IDs are scheduled to be assigned to SPS configurations in one-to-one correspondence, a rule may be defined such that HARQ process IDs {0,1,2,3} are allocated to the first SPS configuration and HARQ process IDs {4,5,6,7} are allocated to the second SPS configuration.

As another method, if the maximum number of HARQ processes is configured for the UE with respect to each SPS configuration, the number of HARQ processes not exceeding the maximum number may be assigned to each SPS configuration. For example, if two SPS configurations are configured and the maximum number of HARQ processes configured for the respective SPS configurations are 2 and 6, a rule may be defined such that HARQ process IDs {0,1} are allocated to the first SPS configuration and HARQ process IDs {2,3,4,5,6,7} are allocated to the second SPS configuration.

As another method, based on a HARQ process ID allocated to the first SPS configuration, a HARQ process ID allocated to another SPS configuration may use a value to which a predefined or signaled offset is applied. As an example, if HARQ process IDs {0,1} are derived for the first SPS configuration and the offset is 4, a rule may be defined such that HARQ process IDs {4,5} are actually derived for the second SPS configuration (if a HARQ process ID determined by a TTI index and/or a periodicity are {0,1}).

Figure 12:
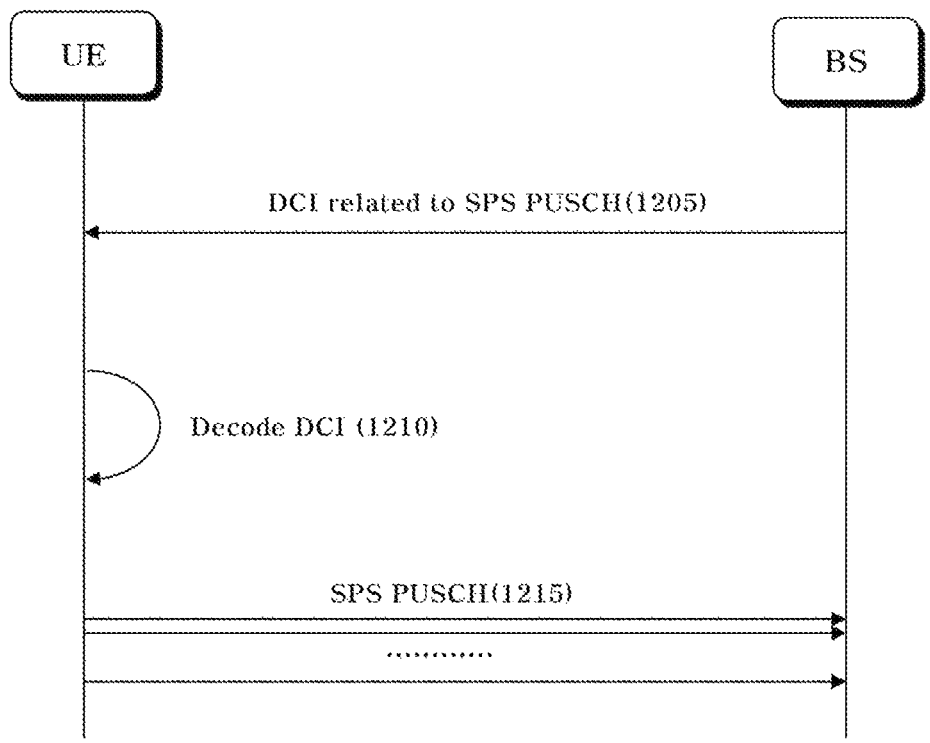
FIG. 12 is a flowchart showing an example of a UL signal transmission and reception method according to implementations of the present disclosure.

FIG. 12 is a flowchart showing an example of a UL signal transmission and reception method according to an implementation of the present disclosure. FIG. 12 is an exemplary implementation of the above-described implementation(s) and the present disclosure is not limited to FIG. 12. A description of repeated parts as compared with the above description may be omitted.

Referring to FIG. 12, a UE may receive, through a physical downlink control (PDCCH) signal from a BS, downlink control information (DCI) regarding a semi-persistent scheduling (SPS) physical uplink shared channel (PUSCH) (step 1205). For example, the DCI may be UL grant DCI and may include a 2-bit demodulation reference signal (DMRS) pattern field.

The UE may decode the DCI that was received through the PDCCH (step 1210).

The UE may periodically transmit, to the BS, an SPS PUSCH signal based on the DCI (step 1215).

Even if physical uplink control channel (PUCCH)-PUSCH simultaneous transmission is configured for the UE in a state in which the SPS PUSCH signal is a subslot-based SPS PUSCH and the DMRS pattern field included in the DCI is set to a first value, the UE may transmit uplink control information (UCI) through the SPS PUSCH signal without transmitting a PUCCH signal. A periodicity of the SPS PUSCH signal may be set to one subslot. For example, in a state in which the SPS PUSCH signal is the subslot-based SPS PUSCH, the periodicity of the SPS PUSCH signal is configured with one subslot, and the DMRS pattern field included in the DCI is set to the first value, if the PUCCH signal for the UCI overlaps with the SPS PUSCH signal in the time domain, the UE may transmit the SPS PUSCH signal without transmitting the PUCCH signal even when PUCCH-PUSCH simultaneous transmission is configured therefor.

Additionally, in a state in which the SPS PUSCH signal is the subslot-based SPS PUSCH and the DMRS pattern field included in the DCI is set to the first value, the BS may receive uplink control information (UCI) through the SPS PUSCH signal without receiving the PUCCH signal even if PUCCH-PUSCH simultaneous transmission is configured for the UE. A periodicity of the SPS PUSCH signal may be configured with one subslot. For example, in a state in which the SPS PUSCH signal is the subslot-based SPS PUSCH, the periodicity of the SPS PUSCH signal is set to one subslot, and the DMRS pattern field included in the DCI is set to the first value, if the PUCCH signal for the UCI overlaps with the SPS PUSCH signal in the time domain, the BS may receive the SPS PUSCH signal without receiving the PUCCH signal even when PUCCH-PUSCH simultaneous transmission is configured for the UE.

When there is no transmission of the PUCCH signal, the UCI may be transmitted through the SPS PUSCH signal on which the UCI is piggybacked.

The UCI may include at least one of hybrid automatic repeat request-acknowledgment (HARQ-ACK) or a scheduling request (SR).

If the DMRS pattern field is set to the first value, one-time UL DMRS transmission may be sharable between a plurality of SPS PUSCH signal transmissions.

The DMRS pattern field may indicate whether the SPS PUSCH signal and a UL DMRS are always transmitted in the same slot. If the DMRS pattern field is set to the first value, the SPS PUSCH signal and the UL DMRS may be transmitted in different subslots. If the DMRS pattern field is set to a second value (e.g., a bit value of 00), the SPS PUSCH signal and the UL DMRS may always be transmitted in the same subslot.

If the DMRS pattern field is set to the first value, a UL DMRS for an SPS PUSCH signal transmitted in subslot #1 may be transmitted in subslot #2 and a UL DMRS for an SPS PUSCH signal transmitted in subslot #4 may be transmitted in subslot #5.

The DMRS pattern field may be 2 bits and the first bit value may be a bit value of '10'.

The UE may drop the PUCCH signal regardless of whether transmission power of the SPS PUSCH signal is changed due to the PUCCH signal.

A plurality of UL SPS configurations may be configured for the UE in relation to UL SPS. Different hybrid automatic repeat request (HARD) process sets may be associated with the UL SPS configurations, respectively.

Figure 13:
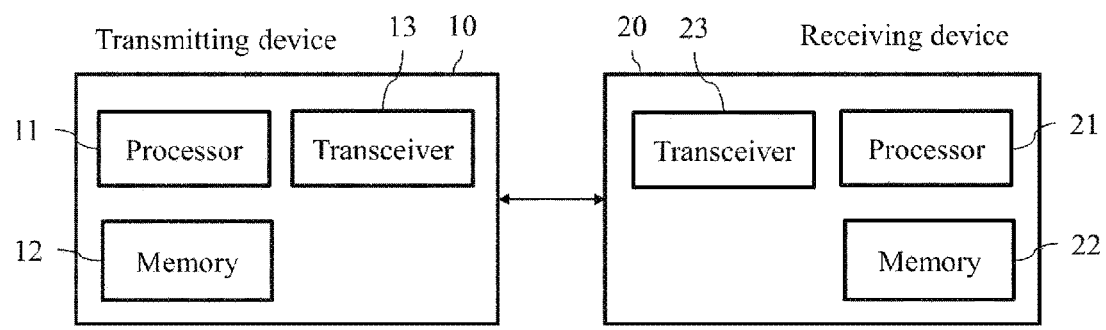
FIG. 13 is a block diagram showing an example of an apparatus according to implementations of the present disclosure.

FIG. 13 is a block diagram illustrating an example of a transmitting device 10 and a receiving device 20 configured to implement implementations of the present disclosure. Each of the transmitting device 10 and receiving device 20 includes at least transmitter/receiver 13, 23 that can transmit or receive a radio signal that carries information and/or data, a signal, a message, etc., at least one memory 12, 22 configured to store various kinds of information related to communication with a wireless communication system, and at least one processor 11, 21 operatively connected to elements such as the transmitter/receiver 13, 23 and the memory 12, 22 to control the memory 12, 22 and/or the transmitter/receiver 13, 23 to allow the device to implement at least one of the implementations of the present disclosure described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present disclosure. The processors 11 and 21 may be referred to as controllers, microcontrollers, microprocessors, microcomputers, or the like. The processors 11 and 21 may be achieved by hardware, firmware, software, or a combination thereof. In a hardware configuration for an implementation of the present disclosure, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present disclosure. In the case which the present disclosure is implemented using firmware or software, the firmware or software may be provided with a module, a procedure, a function, or the like which performs the functions or operations of the present disclosure. The firmware or software configured to implement the present disclosure may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include $N_t$ transmit antennas (wherein $N_t$ is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include $N_r$ receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an implementation of the present disclosure, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. A transmitter/receiver supporting the Multiple-Input Multiple-Output (MIMO) for transmitting and receiving data using a plurality of antennas may be connected to two or more antennas.

In implementations of the present disclosure, the UE or the terminal operates as the transmitting device 10 on uplink, and operates as the receiving device 20 on downlink. In implementations of the present disclosure, the eNB or the base station operates as the receiving device 20 on uplink, and operates as the transmitting device 10 on downlink.

The transmitting device and/or the receiving device may perform a combination of at least one implementation or two or more implementations among the implementations of the present disclosure.

Detailed descriptions of preferred implementations of the present disclosure have been given to allow those skilled in the art to implement and practice the present disclosure. Although descriptions have been given of the preferred implementations of the present disclosure, it will be apparent to those skilled in the art that various modifications and variations can be made in the present disclosure defined in the appended claims. Thus, the present disclosure is not intended to be limited to the implementations described herein, but is intended to have the widest scope consistent with the principles and novel features disclosed herein.

The present disclosure can be used for such a wireless communication device as a terminal, a relay, a base station, and the like.

What is claimed is:

1. A method of transmitting an uplink (UL) signal by a user equipment (UE) configured for simultaneous physical uplink shared channel (PUSCH) and physical uplink control channel (PUCCH) transmission in a wireless communication system, the method comprising:
    receiving, through a physical downlink control (PDCCH), downlink control information (DCI) regarding subslot-based semi-persistent scheduling (SPS) PUSCH, wherein the DCI includes a demodulation reference signal (DMRS) pattern-related field for the UE to transmit a an uplink (UL) DMRS related to the subslot-based SPS PUSCH;
    determining whether to transmit uplink control information (UCI), in subslot n, through the subslot-based SPS PUSCH or through a PUCCH, based on whether the DMRS pattern-related field in the DCI is set to a first value or a second value; and
    transmitting the UCI through the subslot-based SPS PUSCH in the subslot n, without simultaneously transmitting the PUCCH in the subslot n, based on the DMRS pattern-related field in the DCI being set to the first value,
    wherein the first value of the DMRS pattern-related field indicates that the UL DMRS is not mapped to at least one subslot among a plurality of subslots in which the subslot-based SPS PUSCH is transmitted, and
    wherein the second value of the DMRS pattern-related field indicates that the UL DMRS is mapped to every subslot among the plurality of subslots in which the subslot-based SPS PUSCH is transmitted.

2. The method of claim 1, wherein a periodicity of the subslot-based SPS PUSCH is configured to be one subslot.

3. The method of claim 1, wherein a transmission of the PUCCH is configured to overlap in time with a transmission of the subslot-based SPS PUSCH during the subslot n.

4. The method of claim 1, wherein, based on the DMRS pattern-related field being set to the first value, a one-time UL DMRS transmission is configured to be shared between a plurality of subslot-based SPS PUSCH transmissions which are transmitted in different subslots.

5. The method of claim 1, wherein the DMRS pattern-related field indicates whether the subslot-based SPS PUSCH and the UL DMRS are transmitted in a same subslot.

6. The method of claim 5, wherein, based on the DMRS pattern-related field being set to the first value, the subslot-based SPS PUSCH and the UL DMRS are transmittable in different subslots, and
wherein based on the DMRS pattern-related field being set to the second value, the subslot-based SPS PUSCH and the UL DMRS are restricted to be transmitted in a same subslot.

7. The method of claim 5, wherein, based on the DMRS pattern-related field being set to the first value:
a first UL DMRS, for a first subslot-based SPS PUSCH that was transmitted in subslot #1, is transmitted in subslot #2, and
a second UL DMRS, for a second subslot based SPS PUSCH that was transmitted in subslot #3, is transmitted in subslot #4.

8. The method of claim 1, wherein the DMRS pattern-related field has a size of 2 bits, and
wherein the first value of the DMRS pattern-related field has a bit value of '10'.

9. The method of claim 1, wherein transmitting the UCI through the subslot-based SPS PUSCH in the subslot n, without simultaneously transmitting the PUCCH in the subslot n, based on the DMRS pattern-related field in the DCI being set to the first value comprises:
transmitting the UCI through the subslot-based SPS PUSCH in the subslot n, and dropping a transmission of the PUCCH in the subslot n, regardless of whether a transmission power of the subslot-based SPS PUSCH is changed due to the PUCCH.

10. The method of claim 1, wherein a plurality of UL SPS configurations is configured for the UE in relation to UL SPS, and
wherein different hybrid automatic repeat request (HARD) process sets are associated with the plurality UL SPS configurations, respectively.

11. The method of claim 1, wherein the UCI comprises HARQ acknowledgment/negative acknowledgment (ACK/NACK) information.

12. The method of claim 1, further comprising:
based on the DMRS pattern-related field in the DCI being set to the second value, transmitting the UCI through the PUCCH in the subslot n, while simultaneously transmitting the subslot-based SPS PUSCH in the subslot n.

13. A method of receiving an uplink (UL) signal by a base station (BS) from a user equipment (UE) configured for simultaneous physical uplink shared channel (PUSCH) and physical uplink control channel (PUCCH) transmission in a wireless communication system, the method comprising:
transmitting, to the UE through a physical downlink control (PDCCH), downlink control information (DCI) regarding subslot-based semi-persistent scheduling (SPS) PUSCH, wherein the DCI includes a demodulation reference signal (DMRS) pattern-related field for the UE to transmit a an uplink (UL) DMRS related to the subslot-based SPS PUSCH; and
receiving uplink control information (UCI), in subslot n, from the UE through the subslot-based SPS PUSCH or through a PUCCH, based on whether the DMRS pattern-related field in the DCI is set to a first value or a second value,
wherein the UCI is received through the subslot-based SPS PUSCH in the subslot n, without simultaneously receiving the PUCCH in the subslot n, based on the DMRS pattern-related field in the DCI being set to the first value,
wherein the first value of the DMRS pattern-related field indicates that the UL DMRS is not mapped to at least one subslot among a plurality of subslots in which the subslot-based SPS PUSCH is received, and
wherein the second value of the DMRS pattern-related field indicates that the UL DMRS is mapped to every subslot among the plurality of subslots in which the subslot-based SPS PUSCH is received.

14. A user equipment (UE) configured for simultaneous physical uplink shared channel (PUSCH) and physical uplink control channel (PUCCH) transmission in a wireless communication system, the UE comprising:
a transceiver;
at least one processor; and
at least one computer memory operably connectable to the at least one processor and storing instructions that, when executed, cause the at least one processor to perform operations comprising:
receiving, through a physical downlink control (PDCCH) via the transceiver, downlink control information (DCI) regarding subslot-based semi-persistent scheduling (SPS) PUSCH, wherein the DCI includes a demodulation reference signal (DMRS) pattern-related field for the UE to transmit a an uplink (UL) DMRS related to the subslot-based SPS PUSCH;
determining whether to transmit uplink control information (UCI), in subslot n, through the subslot-based SPS PUSCH or through a PUCCH, based on whether the DMRS pattern-related field in the DCI is set to a first value or a second value; and
transmitting, via the transceiver, the UCI through the subslot-based SPS PUSCH in the subslot n, without simultaneously transmitting the PUCCH in the subslot n, based on the DMRS pattern-related field in the DCI being set to the first value,
wherein the first value of the DMRS pattern-related field indicates that the UL DMRS is not mapped to at least one subslot among a plurality of subslots in which the subslot-based SPS PUSCH is transmitted, and
wherein the second value of the DMRS pattern-related field indicates that the UL DMRS is mapped to every subslot among the plurality of subslots in which the subslot-based SPS PUSCH is transmitted.

15. A base station (BS) configured to receive an uplink (UL) signal from a user equipment (UE) configured for simultaneous physical uplink shared channel (PUSCH) and physical uplink control channel (PUCCH) transmission, the BS comprising:
a transceiver;
at least one processor; and
at least one computer memory operably connectable to the at least one processor and storing instructions that, when executed, cause the at least one processor to perform operations comprising:
transmitting, to the UE through a physical downlink control (PDCCH) via the transceiver, downlink control information (DCI) regarding subslot-based semi-persistent scheduling (SPS) PUSCH, wherein the DCI includes a demodulation reference signal (DMRS) pattern-related field for the UE to transmit a an uplink (UL) DMRS related to the subslot-based SPS PUSCH; and receiving, from the UE via the transceiver in subslot n, uplink control information (UCI) through the subslot-based SPS PUSCH or through a PUCCH, based on whether the DMRS pattern-related field in the DCI is set to a first value or a second value, wherein the UCI is received through the subslot-based SPS PUSCH in the subslot n, without simultaneously receiving the PUCCH in the subslot n, based on the DMRS pattern-related field in the DCI being set to the first value, wherein the first value of the DMRS pattern-related field indicates that the UL DMRS is not mapped to at least one subslot among a plurality of subslots in which the subslot-based SPS PUSCH is received, and wherein the second value of the DMRS pattern-related field indicates that the UL DMRS is mapped to every subslot among the plurality of subslots in which the subslot-based SPS PUSCH is received.

* * * * *